United States Patent
Soliman et al.

(10) Patent No.: US 12,499,879 B1
(45) Date of Patent: Dec. 16, 2025

(54) NATURAL LANGUAGE UNDERSTANDING SYSTEMS

(71) Applicant: Amazon Technologies, Inc., Seattle, WA (US)

(72) Inventors: Mohamed Soliman, Aachen (DE); Abdalghani Abujabal, Aachen (DE); Vinh Thinh Ho, Saarbruecken (DE)

(73) Assignee: Amazon Technologies, Inc., Seattle, WA (US)

( * ) Notice: Subject to any disclaimer, the term of this patent is extended or adjusted under 35 U.S.C. 154(b) by 419 days.

(21) Appl. No.: 17/944,444

(22) Filed: Sep. 14, 2022

(51) Int. Cl.
*G10L 15/183* (2013.01)
*G06F 40/295* (2020.01)
*G10L 15/06* (2013.01)
*G10L 15/22* (2006.01)

(52) U.S. Cl.
CPC .......... *G10L 15/183* (2013.01); *G06F 40/295* (2020.01); *G10L 15/063* (2013.01); *G10L 15/22* (2013.01); *G10L 2015/0635* (2013.01); *G10L 2015/223* (2013.01)

(58) Field of Classification Search
CPC ..... G10L 15/183; G10L 15/063; G10L 15/22; G10L 2015/0635; G10L 2015/223; G06F 40/295
See application file for complete search history.

(56) References Cited

U.S. PATENT DOCUMENTS

| | | | |
|---|---|---|---|
| 11,368,420 B1* | 6/2022 | Crook | G06F 9/453 |
| 2016/0055240 A1* | 2/2016 | Tur | G06F 40/284 |
| | | | 707/706 |
| 2022/0238103 A1* | 7/2022 | Madhusudhan | G10L 15/1815 |

* cited by examiner

*Primary Examiner* — Daniel C Washburn
*Assistant Examiner* — Penny L Caudle
(74) *Attorney, Agent, or Firm* — Pierce Atwood LLP

(57) ABSTRACT

Techniques are described for identifying functionalities (i.e., user experiences) that are requested by users but are not supported by natural understanding (NU) processing. Some embodiments may involve identifying functionalities by transforming user inputs to functionality-based representations. The functionality-based representations may be grouped into individual functionalities. The user inputs associated with an individual functionality may be evaluated using an NU component to determine whether the functionality is supported. These techniques may enable discovery at a functionality level, rather than at a user input level, an intent level, or an entity level. These techniques may also be used to group user inputs to determine trending functionalities.

20 Claims, 15 Drawing Sheets

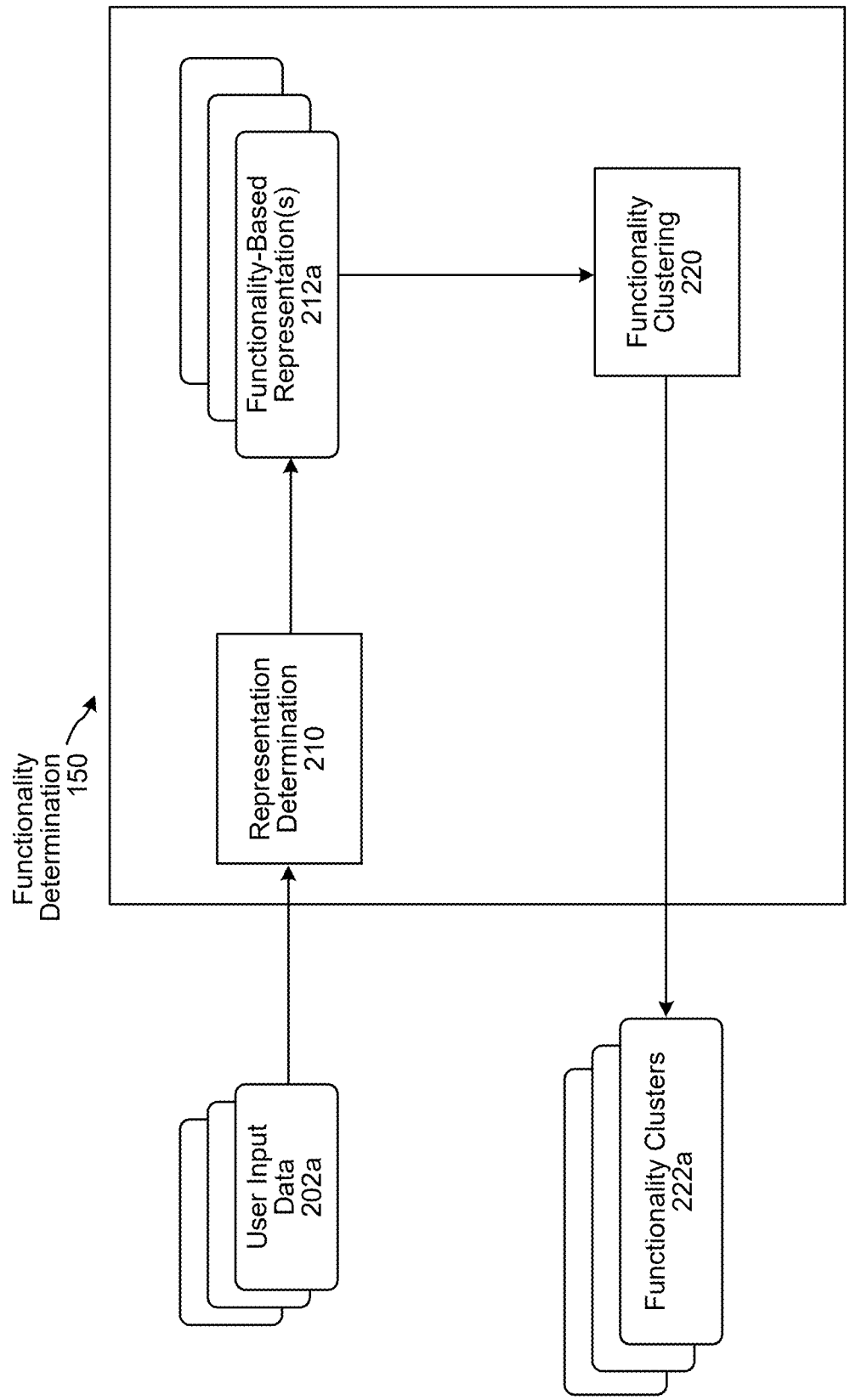

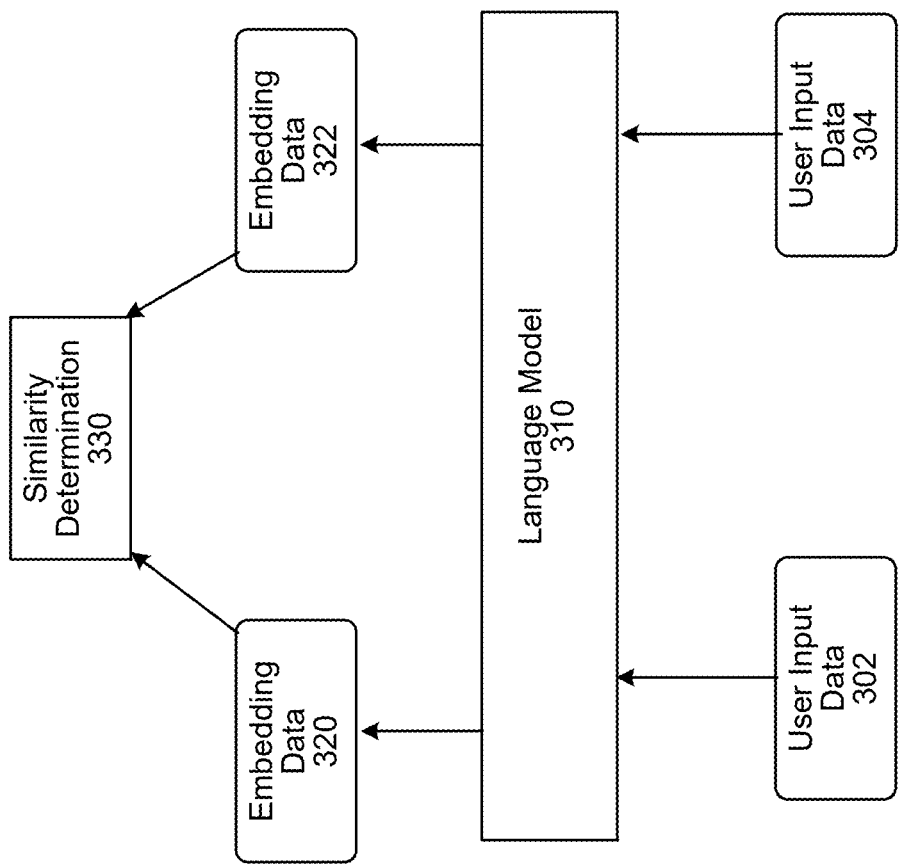

NATURAL LANGUAGE UNDERSTANDING SYSTEMS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 is a conceptual diagram of components of a system for identifying functionality clusters using user inputs, according to embodiments of the present disclosure.

FIG. 3 is a conceptual diagram illustrating an example system for fine-tuning components for identifying the functionality clusters, according to embodiments of the present disclosure.

DETAILED DESCRIPTION

Figure 1A:
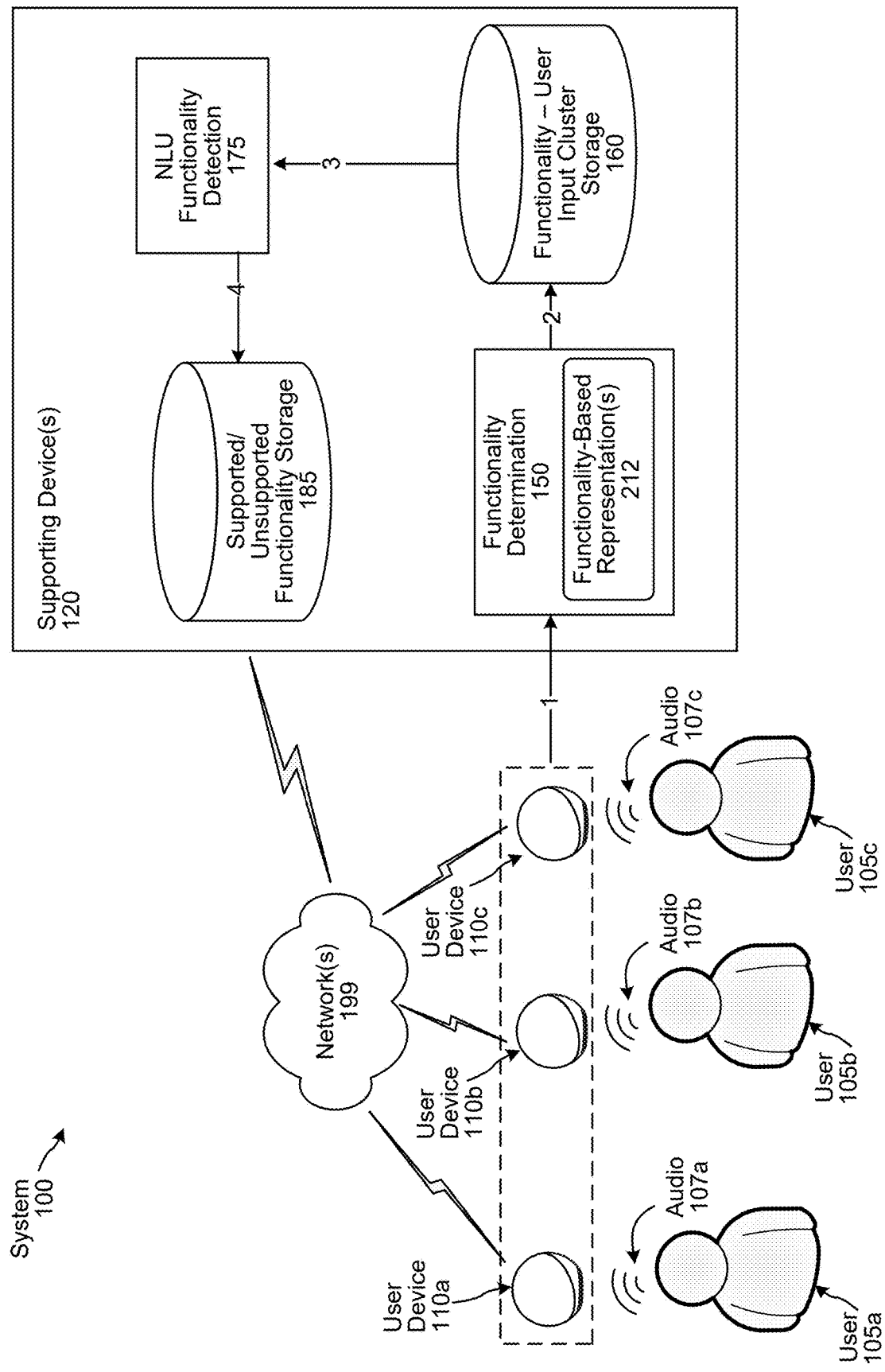
FIG. 1A is a conceptual diagram illustrating a system for determining supported and unsupported functionalities based on groups of user inputs, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. Natural language generation (NLG) can also be used to generate human-understandable outputs representing machine representations of information. The NLG outputs can be shared with human users as synthesized speech (generated using TTS), displayed text, or other ways of communicating natural language content to a user. ASR, NLU, NLG, and TTS may be used together as part of a speech-processing/virtual assistant system.

Certain systems may be configured to perform actions responsive to user inputs. For example, for the user input of "Alexa, play music by [artist]," a system may output music sung by the indicated artist. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may receive a user input as speech. For example, a user may speak an input to a device. The device may send audio data, representing the spoken input, to the system. The system may perform ASR processing on the audio data to generate data (e.g., ASR output data, such as token data or text data) representing the words spoken by the user. The system may perform NLU processing on the ASR output data to determine an intent of the user input as well as portions of the input (e.g., entities) that may be used to perform a requested action.

Advances in NLU have helped accelerate adoption of natural language processing systems, such as Amazon's Alexa system, by end users. NLU components can be configured to, among other things, parse and understand user utterances. Two example tasks of NLU components are: (1) Intent Classification, which involves classifying a user input into a defined set of intent labels as represented by intent data, and (2) Entity (or Slot) Labeling (also known as Named Entity Recognition (NER)), which classifies entity values into a defined set of entity types. NLU processing can also involve domain classification (determining which domain a user input corresponds to) and entity resolution (determining specific entity values corresponding to a user input). Determining the intent labels helps the natural language processing system to perform appropriate actions in response to the user input. For example, the natural language system may determine the user inputs "play some music" and "play [song]" correspond to the intent label "PlayMusic", while and determine the user inputs "how is the weather?" and "is it raining today?" correspond to the intent label "GetWeather". Intents can be further grouped into domains, for example, "PlayMusic" and "RateSong" intent labels may correspond to a Music domain. Detecting entities and their corresponding values within a user input provides information about objects upon which the actions should be performed. For example, the natural language processing system may determine the word "[song]", in the user input "play [song]", corresponds to an entity type "SongName" and an entity value "[song]."

A system may include components for Natural Understanding (NU), which utilizes more information than just language, such as gestures, objects in a user's environment, etc., to understand a user's intent and entities. For example, a user may point a finger to a lamp and speak "on". The NU components may employ computer vision techniques, and may process an image or video captured of the user pointing to the lamp. The combination of the spoken input and interpretation of the gesture may be used to determine an entity value (e.g., the lamp) and use the entity value to determine the user's intent to turn on the particular lamp. The NU components may be configured to also interpret audio inputs other that spoken language. For example, a user may clap when a favorite song is played. The NU components may interpret the clapping as an indication of approval, enjoyment, positive user feedback, etc.

A functionality, as used herein, refers to a desired user experience, which a user may invoke by providing various forms of natural language inputs (or other types of inputs) to the natural language processing system. For example, a first functionality may be playback of a song using a music service, which a user may invoke (or attempt to invoke) by providing a first user input. As another example, a second functionality may be reading of a user's messages which a user may invoke (or attempt to invoke) by providing a second user input. As yet another example, a third functionality may be receiving a weather update which a user may invoke (or attempt to invoke) by providing a third user input. Over time, users may have certain expectations about which functionalities are supported by the natural language processing system, and may attempt to invoke such functionalities (which may be unsupported) via a user input. Unsupported functionalities may cause friction (e.g., the system outputting an undesired response to a user input, the system processing resulting in an error condition, etc.) and can degrade the user experience. With regards to NU processing, an unsupported functionality, as used herein, may be a novel combination of domain(s), intent(s), entity type(s) and/or entity values, where the individual labels may or may not be recognizable by the system despite the combination being unrecognizable. For example, while "PlayMusic" intent label and "BookName" entity type may have been independently recognized by the natural language processing system, potentially in different domains, their combination may not be recognized, causing the NLU components to fail to understand the user's intent when processing user inputs like "play [book name] on Amazon Music." As another example, an intent may correspond to a new domain and may not be recognizable by the system. The techniques described herein may be used to discover that functionality.

Consequently, it is important to discover such functionalities that are frequently requested by the users but are still unsupported by the NU components (e.g., are not built into the models implemented by the NU components). For example, if a book is turned into a movie and a soundtrack pre-released for the movie, the book name may be recognizable even though the NU components have not been updated to recognize the album name for the movie's soundtrack. The present disclosure relates to, among other things, techniques for identifying unsupported functionalities requested by users of a natural language processing system. The present disclosure includes descriptions of improved techniques for identifying unsupported functionalities by identifying functionalities at a granularity level other than individual/separate NU parameters (e.g., domain, intent, entity tagging, entity recognition, etc.). For example, the user inputs, "play [song]", and "play [artist] on Amazon Music", are likely to both result in the same intent label "PlayMusic" by NU systems that support this intent, however, processing with respect to each of them is different. The former causes the system to play a song on the default music service for the device, while the latter requests for playing the same song on a specific service (Amazon Music). To allow for a more fine-grained discovery of unsupported functionalities (i.e., those functionalities not presently built into the models implemented by the NLU components), and close the gap between user requests and NLU component processing capabilities, the techniques described herein define a functionality to be any combination of NU parameters (e.g., domain(s), intent(s) and entity(ies) and/or entity value(s), etc.), and involve identifying clusters of user inputs with unsupported functionality definitions rather than focusing on novel intent, domain, or entity on an individual-basis.

Some embodiments of the present disclosure use a semi-supervised technique for identifying unsupported functionalities from a given set of user inputs. Such technique utilizes knowledge from existing functionalities to guide the identification process. Some embodiments involve a system with two steps: (1) functionality clustering and (2) novelty detection. For the functionality clustering step, a language model (e.g., a Bidirectional Encoder Representations from Transformers (BERT) model) may be coupled with multi-stage fine-tuning steps to generate functionality-based representations of user inputs. Using the functionality-based representations, user inputs may then be clustered into functionalities. For the novelty detection step, a classifier may be used to label the individual resulting functionality clusters as either novel/unsupported or already supported by the NLU components.

The techniques described herein can also be used to identify trending functionalities (functionalities presently being frequently requested by users), and determining output data corresponding to trending functionalities.

The techniques of the present disclosure provide, among other things, an improved mechanism for identifying a functionality corresponding to a group of user inputs. Based on identifying the functionality, the techniques described herein can be used to provide an improved user experience for natural language processing systems.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1B:
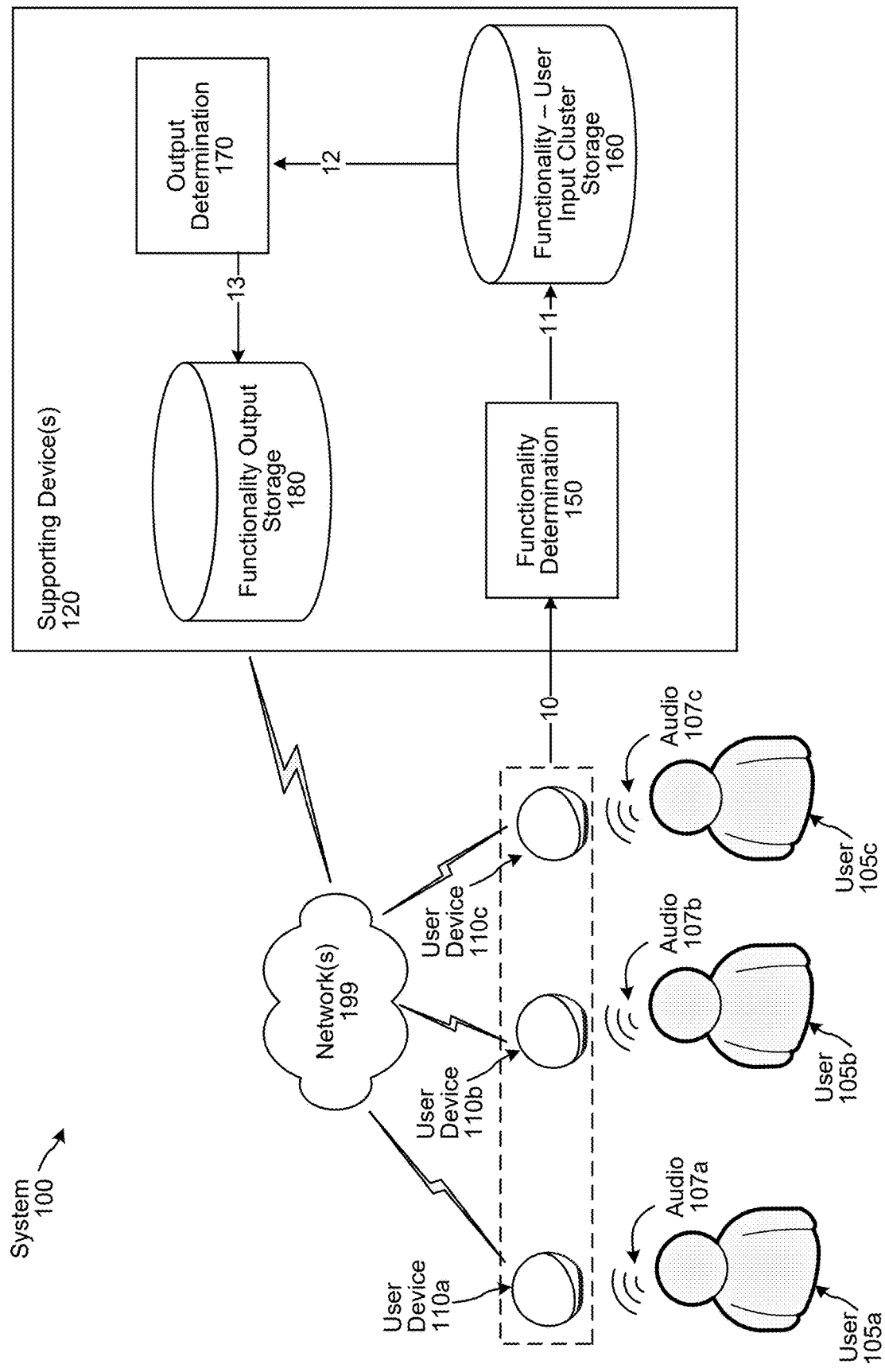
FIG. 1B is a conceptual diagram illustrating a system for determining functionalities corresponding to groups of user inputs, according to embodiments of the present disclosure.

FIG. 1A is a conceptual diagram illustrating a system 100 for determining supported and unsupported functionalities based on groups of user inputs, according to embodiments of the present disclosure. FIG. 1B is a conceptual diagram illustrating another embodiment where the system 100 determines outputs based on determining functionalities corresponding to groups of user inputs, according to embodiments of the present disclosure. As shown in FIGS. 1A and 1, the system 100 may include one or more user devices 110a, 110b, 110c, local to respective individual users 105a, 105b, and 105c, connected to a supporting device 120 across one or more networks 199. In some embodiments, the supporting device(s) 120 may be a natural language processing system, and may include one or more components shown in and described in relation to FIG. 7. In some embodiments, the user devices 110 may be voice-enabled devices and may be configured to capture spoken inputs from the users 105. Additionally or alternatively, the users 105 may provide non-speech inputs (e.g., textual inputs, selection of user interface elements presented via a display of the user device 110, gesture inputs, etc.) to the devices 110. Although the figures and discussion of the present disclosure illustrate certain steps in a particular order, the steps described may be performed in a different order (as well as certain steps removed or added) without departing from the present disclosure. The techniques described herein are language-agnostic, and can be used to process user inputs of multiple different natural languages.

The user device 110 may receive audio 107 corresponding to a spoken natural language input originating from the user 105 (e.g., the user device 110a may receive audio 107a corresponding to a spoken natural language input originated from the user 105a, etc.). The user device 110 may generate audio data corresponding to the audio 107, and may send the audio data to the supporting device(s) 120 for further processing. The user device 110 may send the audio data to the supporting device(s) 120 via an application that is installed on the user device 110 and associated with the supporting device(s) 120 (i.e., through which the user device 110 sends data to and receives data from the supporting device(s) 120). An example of such an application is the Amazon Alexa application that may be installed on a smart phone, tablet, or the like. In some implementations, the user device 110 may receive typed text corresponding to a natural language input originating from the user 105, and send text data (corresponding to the typed text) to the supporting device(s) 120. The user device 110 may also receive output data from the supporting device(s) 120, and generate a synthesized speech output. The user device 110 may include a camera for capturing image and/or video data for processing by the supporting device(s) 120. Examples of various user devices 110 are further illustrated in FIG. 14. The supporting device(s) 120 may be a remote system, such as a group of computing components located geographically remote from the user device 110 but accessible via the network(s) 199 (for example, servers accessible via the internet). The supporting device(s) 120 may also include a remote system that is physically separate from the user device 110 but located geographically close to the user device 110 and accessible via the network(s) 199 (for example a home server located in a same residence as the user device 110). The supporting device(s) 120 may also include some combination thereof, for example where certain components/operations are performed via a home server(s) and others are performed via a geographically remote server(s).

As shown in FIG. 1A, the supporting device(s) 120 may include a functionality determination component 150 configured to determine a functionality corresponding to a group of user inputs received by the user device(s) 110. A functionality, as used herein, refers to a desired user experience, which users may attempt to invoke using various forms of natural language inputs. For example, the user inputs "create a new playlist with songs by [artist]" and "create a new playlist with my favorite songs" correspond to a functionality for creating a new playlist with certain songs. As another example, the user inputs "play a song by [artist]", "play a song", and "play songs on radio" correspond to a functionality for playing a song. As yet another example, "delete [song] from playlist" or "remove all songs from my playlist" correspond to a functionality for deleting a song from a playlist. As a further example, the user inputs "add [song] by [artist] to my playlist" corresponds to a functionality for adding a song by an artist to a playlist. As a further example, the user inputs "remove [name] playlist" and "delete my playlist" corresponds to a functionality for deleting a playlist. As another example, the user inputs "what is the weather today in [city]" and "tell me how is the weather tomorrow in [city]" correspond to a functionality of getting weather on a specific day for a specific city. As another example, the user inputs "what is the weather in [city]", "weather in [first city]", and "weather in [second city]" correspond to a functionality for getting the weather for a specific city. As yet another example, the user input "play [book name]" corresponds to a functionality to listen to an electronic book.

The functionality determination component 150 may be configured to detect groups (e.g., clusters) of user inputs where an individual group is composed of semantically related and coherent user inputs. With respect to the end-user (i.e., the user 105a, 105b, 105c, etc.), each cluster represents a single functionality. For example, a functionality group may include user inputs that have the same meaning of "getting weather information for a certain city on a specific day". The criteria that user inputs in an individual group share may be: the same NLU parameters (e.g., the same intent(s), the same entity type(s), the same entity value(s), etc.) or a combination of NLU parameters (e.g., a combination of intent(s) and entity type(s), a combination of intent(s), entity type(s) and entity value(s), etc.).

The functionality determination component 150 may receive (step 1) input data corresponding to user inputs (e.g., natural language inputs) provided by the users 105 to the user devices 110. In other cases, the input data may correspond to user inputs received by other devices that may not be part of the system 100 or may not be in communication with the supporting device(s) 120. The input data may be ASR output data (determined by an ASR component 750/850 by processing audio data corresponding to the audio 107). In some embodiments, the input data may be text data or other type of data that is derived from the user input (e.g., typed input, textual input, selection of GUI elements, gesture input, image input, etc.). Such user inputs may have previously been received (and processed) by the supporting device(s) 120. Although FIG. 1A illustrates the input data being received from the user devices 110 at step 1, it should be understood that the input data may be stored in a data storage at the supporting device(s) 120 or in communication with the supporting device(s) 120, and the functionality determination component 150 may receive the input data from the data storage.

The functionality determination component 150 may process the input data corresponding to user inputs to determine one or more groups of user inputs, where an individual group of user inputs corresponds to a same functionality. The functionality determination component 150 may determine, using a component (e.g., a representation determination component 210 shown in FIG. 2), functionality-based representation data 212 corresponding to the input data. The representation determination component 210 may be configured to generate representation vectors in a space corresponding to functionalities invoked by one or more users 105 of the natural language processing system. As described below in relation to FIG. 3, the representation determination component 210 may be configured using a user input similarity technique involving the use of at least a first natural language input associated with a first functionality, a second natural language input associated with the first functionality, and a third natural language input associated with a second functionality. Using the functionality-based representation data 212, the functionality determination component 150 may then determine that a group of user inputs correspond to a first functionality. Further details of the functionality determination component 150 are described below in relation to FIG. 2.

The functionality determination component 150 may output a group of user inputs corresponding to a functionality (e.g., a functionality cluster 222a), which may be stored (step 2) in a functionality user input-cluster storage 160. In some embodiments, the corresponding functionality may be identified using a textual description (e.g., "delete playlist functionality" or "get weather in a certain city on a specific day functionality"). In other embodiments, the corresponding functionality may be identified generally, for example, a first functionality, a second functionality, etc. In some embodiments, a domain and/or an intent (if available) corresponding to the group of user inputs may be used to generate the textual description of the functionality. In other embodiments, portions of the user inputs, for example, words, tokens, n-grams, etc. may be extracted using supervised or unsupervised methods, models (e.g., machine learning models, statistical models, etc.) and may be used to determine the textual description of the functionality. In yet other embodiments, the textual description of the functionality may be determined manually.

Other information relating to the group of user inputs may also be stored in the functionality user input-cluster storage 160, which, for example, may be used to determine output data corresponding to the functionality. Such information relating to the group of user inputs may include a time period (e.g., last week, two weeks ago, last year, within the past year, etc. spanning from the first temporally received user input of the group to the last temporally received user input of the group) during which the user inputs were received by the natural language processing system. In some embodiments, individual user inputs may be associated with time information (e.g., day of the week, time of day, timestamp, etc.) representing when the user input was received by the natural language processing system. Other information relating to the group of user inputs may include geographic information (e.g., a city, a state, a region of a country, etc.) from which the user input was received or in which the user device 110/the user 105 was located when providing the user input. In some embodiments, individual user inputs may be associated with the geographic information.

After the functionality-user input groups are determined, the supporting device(s) 120 may determine whether the functionality is supported or unsupported by an NLU component(s). In some embodiments, the supporting device(s) 120 may include an NLU functionality detection component 175, which may receive (step 3) the functionality-user input groups from the storage 160. Components of and details on how the NLU functionality detection component 175 determines whether the functionality is supported or not are described below in relation to FIG. 6.

The NLU functionality detection component 175 may output and store (step 4) labels in a supported/unsupported functionality storage 185. The NLU functionality detection component 175 store a supported label associated with a functionality based on the functionality being supported by the NLU component(s). The NLU functionality detection component 175 stores an unsupported label associated with a functionality based on the functionality being unsupported by the NLU component(s).

In some embodiments, the supporting device(s) 120 may determine that a NU component, which can include NLU components described herein, is to be configured (e.g., updated, retrained, etc.) to be able to process with respect to an unsupported functionality. In such cases, the NLU functionality detection component 175 may store (step 4) the group of user inputs corresponding to the unsupported functionality in the supported/unsupported functionality storage 185. The system 100 (in particular, an unillustrated model training system, which may or may not be implemented as part of the supporting device(s) 120) may use the stored group of user inputs to configure the NLU component. For example, the system 100 may generate training data including the stored user inputs, and may train a model for NU/NLU processing to recognize the (unsupported) functionality. As another example, the system 100 may use one or more automated training techniques, where the stored user inputs may be used as ground truth labels for configuring an NU/NLU model.

Now referring to FIG. 1B, the functionality determination component 150 may receive (step 10) input data corresponding to user inputs (e.g., natural language inputs) provided by the users 105 to the user devices 110, in a similar manner as described in relation to step 1 of FIG. 1A. The functionality determination component 150 may process (in a similar manner as described above in relation to FIG. 1A) the input data corresponding to user inputs to determine one or more groups of user inputs, where an individual group of user inputs corresponds to a same functionality. The functionality determination component 150 may output a group of user inputs corresponding to a functionality (e.g., a functionality cluster 222a), which may be stored (step 11) in the functionality user input-cluster storage 160, along with other information, as described above in relation to FIG. 1A.

After the functionality-user input groups are determined, the supporting device(s) 120 may determine output data corresponding to individual functionalities, where the output data is determined based on recognizing that a particular functionality is being requested by the users 105. In some embodiments, the supporting device(s) 120 may include an output determination component 170, which may receive (step 12) the functionality-user input groups from the storage 160.

In some embodiments, the output determination component 170 (or another component) may determine output data corresponding to an alternative functionality for an unsupported functionality (which may be identified from the supported/unsupported functionality storage 185). Such output data may be stored (step 13) and associated with the unsupported functionality in a functionality output storage 180. When a subsequent user input is received by the natural language processing system and corresponds to the unsupported functionality, the system 100 may present the output data, corresponding to the alternative functionality, in response to the subsequent user input. Based on processing previously received user inputs, the system 100 may determine that a first functionality is unsupported, may determine a second functionality alternative to the first functionality, may determine output data (e.g., natural language output data) corresponding to the second functionality, and may store the output data in the storage 180. At a later time, the supporting device(s) 120 may receive a user input, may process the user input using the functionality determination component 150 to determine that the user input corresponds to the first functionality, and, based on the user input corresponding to the first functionality the system 100, may present the output data in response to receiving the user input. For example, the first/unsupported functionality may be delete a certain song from a playlist, and an alternative second functionality may be skip a certain song. The user 105 may say "delete [song] from my playlist", in response to which, the system 100 may output natural language data stating "I don't understand that request. May be you can try "skip [song]." In this manner, the system 100 may output an alternative option to the user 105, instead of outputting an undesired response (e.g., an error message, performing the wrong action, failing silently, etc.).

The system 100 may determine an alternative functionality for the unsupported functionality in various ways. One way may involve determining an alternative functionality that may achieve similar results to the unsupported functionality. Another way may involve determining an alternative functionality that is associated with the same intent as the unsupported functionality. Yet another way may involve determining an alternative functionality that is associated with the same entity type and/or entity value as the unsupported functionality. Yet another way may involve determining an alternative functionality that is associated with the same domain as the unsupported functionality. In other embodiments, an alternative functionality for the unsupported functionality may be provided by a skill component 790/890 or a domain component.

In some embodiments, the output determination component 170 may determine output data corresponding to a functionality based on determining that users of the natural language processing system have been requesting the particular functionality during a given time period. In one example embodiment, the system 100 may determine that the users 105 have been frequently requesting a first functionality (e.g., a trending functionality) during a recent time period (e.g., past week, past month, past year, etc.). The system 100 may determine a trending functionality based on the number of user inputs corresponding to the first functionality, received by the system, and satisfying a condition (e.g., exceeding a threshold number for a given time period). Based on this determination, the system 100 may determine output data corresponding to the first functionality, and may present the output data at some future time. For example, multiple users 105 may provide multiple user inputs corresponding to a functionality for getting information for a certain movie during the past month. The supporting device(s) 120 may process the multiple user inputs using the functionality determination component 150 to determine that they correspond to the functionality for getting information for a certain movie. Based on this determination, the output determination component 170 may determine output data including information relating to the certain movie, and may store (step 13) the output data in the storage 180 along with an indication of the functionality. Such output data may be presented to a user 105, at a future time, in various ways.

In one example embodiment, the output data may be presented as supplemental information to an output responsive to a user input. For example, the user 105 may say "Turn on the TV," in response to which the system 100 may cause a TV to turn on, may output natural language data "Ok, the TV is on", and then may output natural language data based on the supplemental information such as "Would you like to learn about the [movie]?" or "This [movie] may interest you." In the foregoing, the supplemental information may be based on the output data stored in the storage 180. The supplemental information may be presented as synthesized speech, displayed text/graphics, a notification, a message, etc.

In another example embodiment, the output data may be presented in response to receiving a user input corresponding to the particular functionality. For example, after storing the movie information in the functionality output storage, the user 105 may say "Tell me about [movie]", the system 100 determines (via the functionality determination component 150) the user input corresponds to the functionality, and may retrieve the stored output data from the storage 180 to present to the user 105 in response to the user input.

In some embodiments, the system 100 may determine a trending functionality based on comparing functionalities requested during different time periods. For example, the functionality determination component 150 may process a first plurality of user inputs received during a first time period to determine a first functionality corresponding to the first plurality of user inputs. The functionality determination component 150 may process a second plurality of user inputs received during a second time period, occurring after the first time period, to determine a second functionality corresponding to the second plurality of user inputs. Based on the second time period being more recent than the first time period, the output determination component 170 may determine output data corresponding to the second functionality and store it (step 13) in the storage 180 for future output.

In another example embodiment, the system 100 may determine that users 105 of a particular geographic region have been frequently requesting a first functionality (e.g., a trending functionality). Based on this determination, the system 100 may determine output data corresponding to the first functionality, and may present the output data, at some future time, to a user from that particular geographic region. For example, users 105 of a particular region may provide multiple user inputs corresponding to a functionality for getting information for a certain landmark. The supporting device(s) 120 may process the multiple user inputs using the functionality determination component 150 to determine that they correspond to the functionality for getting information for a certain landmark. Based on this determination, the output determination component 170 may determine output data including information relating to the certain landmark, and may store (step 13) the output data in the storage 180 along with an indication of the functionality. Such output data may be presented to a user 105, at a future time, as supplemental information (as described above), in response to a user input corresponding to the functionality, etc.

In another example embodiment, the functionality determination component 150 may determine that the users 105 have been frequently requesting a first functionality (e.g., a trending functionality) during a particular time of a day, week, month, etc. Based on this determination, the output determination component 170 may determine output data corresponding to the first functionality, and may present the output data, at some future time, to a user during that particular time of day/week/month. For example, users 105 may provide multiple user inputs, in the morning portion of a day, corresponding to a functionality for getting traffic information. The supporting device(s) 120 may process the multiple user inputs using the functionality determination component 150 to determine that they correspond to the functionality for getting traffic information. Based on this determination, the output determination component 170 may determine output data including traffic information, and may store the output data in the storage 180 along with an indication of the functionality. Such output data may be presented to a user 105, at a future time during a morning portion of the day, as supplemental information (as described above), in response to a user input corresponding to the functionality, etc.

Figure 7:
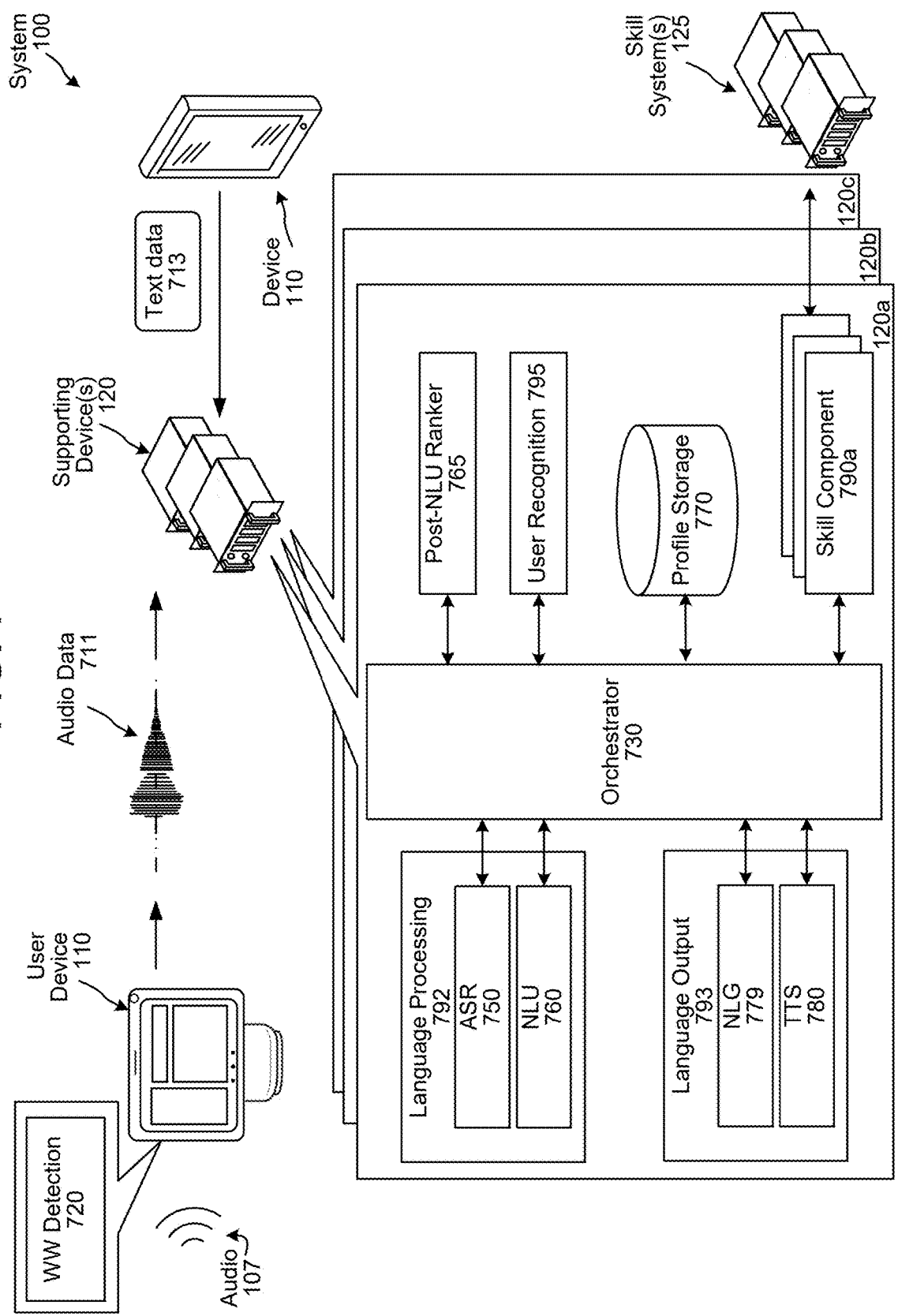
FIG. 7 is a conceptual diagram of components of the system, according to embodiments of the present disclosure.

In determining the output data, the output determination component 170 may communicate with one or more components shown in FIG. 7, for example, the skill components 790/890, the skill systems 125, etc.

In some embodiments, the functionality determination component 150 may receive (e.g., in step 10) and process input data corresponding to (failed) user inputs that resulted in output of an undesired response (e.g., an error in processing, an output not requested by the user, the system being unable to understand the user's request, etc.). The functionality determination component 150 may process the failed user inputs to determine a group of failed user inputs that correspond to a same functionality. In this case, the determined functionality may be an unsupported functionality, and the output determination component 170 may determine output data (as described above) corresponding to the unsupported functionality.

FIG. 2 is a conceptual diagram of components of the functionality determination component 150 for identifying functionality groups using user inputs, according to embodiments of the present disclosure. The system may determine a set of functionality clusters S=$sc_1$, $sc_2$, . . . , $sc_m$, (e.g., functionality clusters 222) from a set of user inputs U=$u_1$, $u_2$, . . . , $u_n$ (e.g., user input data 202) where $sc_j$ is a cluster of user inputs corresponding to a functionality and m is the total number of functionalities. The user input data 202 may be provided to a representation determination component 210 to assign a functionality label to a user input 202a. The representation determination component 210 may assign each user input $u_i$ (e.g., user input data 202) a functionality label to produce a set of functionality-labeled user input pairs ($u_1$, $f_1$), . . . , ($u_n$, $f_n$) (e.g., functionality-based representation(s) 212), where $f_1$, $f_2$, . . . , $f_k$ are the set of k unique functionalities.

The functionality-based representation(s) 212 output by the representation determination component 210 may be the user input data 202 encoded into a functionality-based vector space that is used for clustering the user input data 202 by functionality. The representation determination component 210 may include a model(s) (e.g., an encoder, a language model, another type of ML model, etc.) that is configured to transform the user input data 202 (which represents a natural language input, e.g., a sentence) to a representation (e.g., the functionality-based representation 212) in a vector space corresponding to functionalities requested by users. During training operations (which include fine-tuning operations), the representation determination component 210 may learn to generate the functionality-based representation 212 based on a functionality corresponding to the user input. As such, a first functionality-based representation 212a of a first user input that can be used to invoke a first functionality may be similar to a second functionality-based representation 212b of a second user input that can be used to invoke the same first functionality. Representations for user inputs corresponding to the same functionality may be located close to each other within the vector space. The user inputs can be clustered based on where the functionality-based representations 212 are located within the vector space. For example, the functionality-based representations 212 for the user inputs "delete [song] from playlist" and "remove all songs from my playlist" may be close to each other within the vector space based on them corresponding to the same functionality of deleting a song from a playlist.

The representation determination component 210 may include a Sentence BERT (SBERT) model that is pretrained for generating sentence embeddings. The SBERT model may be further trained/fine-tuned so that the generated sentence embeddings map to a functionality-based vector space. Further details regarding the fine-tuning performed with respect to the representation determination component 210 are described below with regard to FIGS. 3, 4, and 5.

Figure 4:
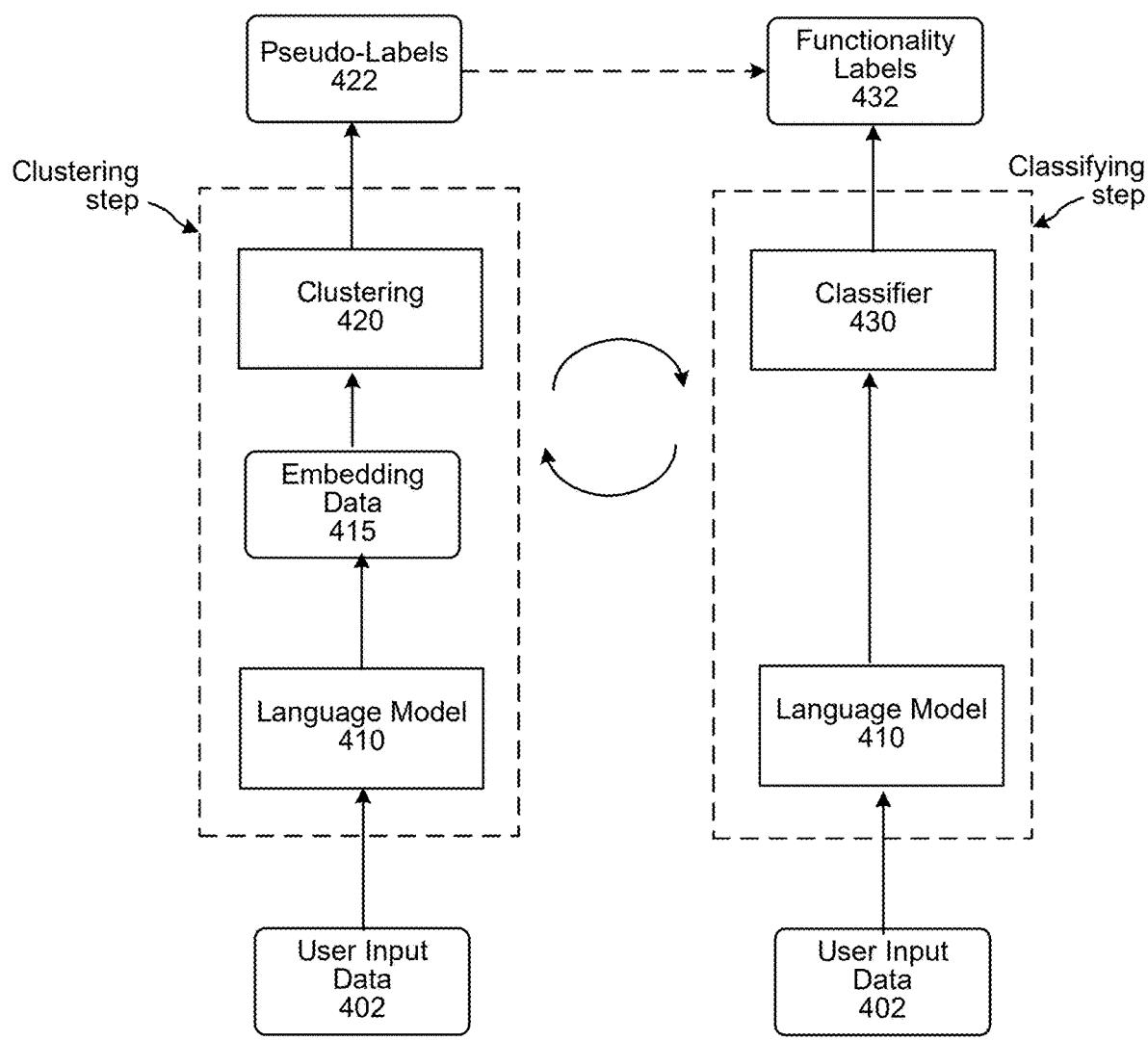
FIG. 4 is a conceptual diagram illustrating another example system for fine-tuning components for identifying the functionality clusters, according to embodiments of the present disclosure.
Figure 5:
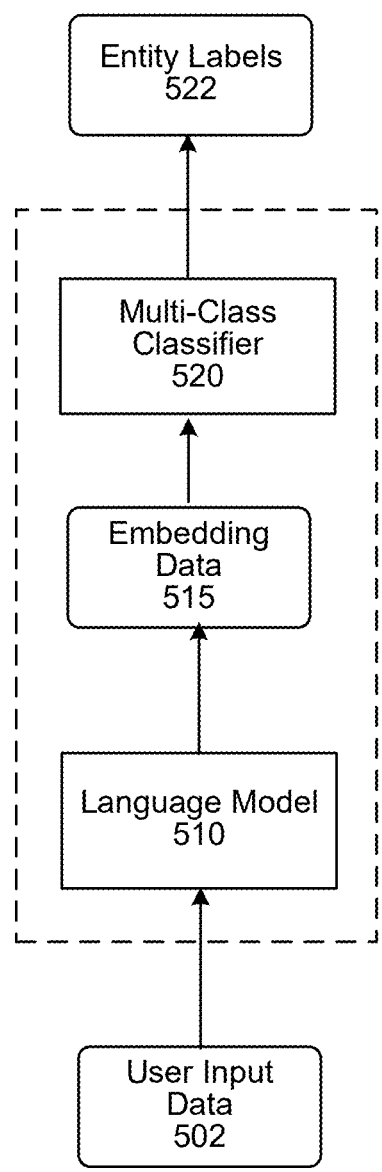
FIG. 5 is a conceptual diagram illustrating another example system for fine-tuning components for identifying the functionality clusters, according to embodiments of the present disclosure.

In some embodiments as part of the fine-tuning components described in reference to FIGS. 3, 4, and 5, the identification of unsupported functionalities may use a semi-supervised technique, and thus the training data for the representation determination component 210 may include functionality-labeled user inputs and functionality-unlabeled user inputs. For the functionality-labeled training data ($Train_L$), each user input 202 may include, in addition to the functionality label f, an intent label I and entity labels S={$s_1$, $s_2$, . . . } where each $s_i$ is a pair of entity type and the value of the entity type in the user input data 202. For example, '[song]' in "play [song]" corresponds to entity type "SongName" and entity value "[song]."

For the functionality-unlabeled training data ($Train_U$), each user input 202 includes intent label and entity labels, but does not have a functionality label. While the functionality-unlabeled training data may not include the functionality label, the functionality-unlabeled training data may be obtained in large quantities and may be used to assist in the unsupported functionality discovery process by using the intent and entity data corresponding to the user input data 202.

The functionality-based representation(s) 212 resulting from the input of the user input data 202 to the representation determination component 210 may then be used as input to a functionality clustering component 220. For example, the user input "Play jazz music" and the user input "Play [song]" both may correspond to the functionality, or user experience, of playing a song. Thus, the user input "Play jazz music" and the user input "Play [song]" may be grouped into the same functionality cluster 222 by the functionality clustering component 220 based on being labeled with the same functionality in the functionality-based representation 212.

FIG. 3 is a conceptual diagram illustrating an example system for fine-tuning the representation determination component 210 for identifying the functionality groups, according to embodiments of the present disclosure. The technique illustrated in FIG. 3 may involve a set of functionality-labeled data. For example, training data may include user inputs for five different functionalities, and user inputs corresponding to the same functionality may be labeled as such. User input data 302 corresponding to a first functionality and user input data 304 corresponding to a second functionality may be inputted to a language model 310. In this case, the user input 302 and the user input data 304 correspond to different functionalities, and the language model 310 learns, during training operations, that these user inputs are not similar, and generates representation vectors that are further apart from each other in a functionality-aware space. The training operations further involve inputting another user input data 302 and another user input data 304 that correspond to the same functionality. In this case, the language model 310 learns that these user inputs are similar, and generates representation vectors that are closer to each other within the functionality-aware space.

The representation determination component 210 may be adapted for functionality-based representation(s) 212 by encoding user input data 202 as high-dimensional vectors that are separable in the functionality space. The representation determination component 210 may include a language model 310, which may be, in some embodiments, a Sentence BERT (SBERT) that is pretrained for generating sentence embeddings. By providing the user input data 202 as input to the SBERT a set of token embeddings [CLS, $t_1$, $t_2$, ..., $t_m$] may be generated, where CLS is the classification token. Mean pooling may then be applied to obtain the functionality-based representation vector of u (e.g., user input 202a), and as shown in equation (1).

$$e_u = \text{mean pooling}([CLS, t_1, t_2, \ldots, t_m]) \quad \text{Equation (1)}$$

In some embodiments, the example system illustrated in FIG. 3 may determine a similarity between user inputs. The fine tuning, as illustrated in FIG. 3 may optimize the user input data 202 based on functionality similarity. As shown in FIG. 3, the language model component 310 may receive as input a pair of user inputs (e.g., user input data 302 and user input data 304). The language model component 310 may be a Siamese Neural Network (SNN). The language model component 310 may encode the received user inputs (e.g., user input data 302 and user input data 304) into embedding vectors (e.g., embedding data 320, 322). The similarity determination component 330 may determine the user input functionality similarity of the pair of embedding vectors (e.g., embedding data 320, 322) received from the language model 310. The similarity determination component 330 may determine a cosine distance between the embedding vectors and is trained to minimize the distance between two embedding vectors (and the corresponding user input data) that are of the same functionality. Determining the similarity between pairs of user inputs may be used to fine-tune the language model 310/the representation determination component 210.

The training data for the system illustrated in FIG. 3 may include both function-labeled training data ($\text{Train}_L$) and function-unlabeled training data ($\text{Train}_U$). The language model component 310 may be trained using three types of training samples. First, the training sample may be a pair of user inputs $u_i$ and $u_j$ that are labeled as the same functionality in the function-labeled training data ($\text{Train}_L$). This pair ($u_i$, $u_j$) of the same functionality is a positive sample. Second, the training sample may be a pair of user inputs $u_i$ and $u_j$ that are labeled with different functionalities in the function-labeled training data ($\text{Train}_L$). This pair ($u_i$, $u_j$) of the different functionalities is a negative sample. Third, the training sample may be a pair of user inputs $u_i$ and $u_j$, where $u_i$ is from the function-labeled training data ($\text{Train}_L$) and $u_j$ is from the function-unlabeled training data ($\text{Train}_U$). This pair ($u_i$, $u_j$) is a negative sample. These three types of training samples may be used to build a random dataset for each training epoch.

The fine-tuning components illustrated in FIG. 3 to determine functionality similarity considers a pairwise similarity distance between user inputs (e.g., user input data 302 and user input data 304), and does not set global constraints across all user inputs data 202. Additionally, the similarity determination may be optimized based on the functionality-labeled groupings in the function-labeled training data ($\text{Train}_L$) but may not account for the unknown functionality groupings found in the function-unlabeled training data ($\text{Train}_U$). The fine-tuned language model 310 may be included in the representation determination component 210 for use during runtime/inference processing.

FIG. 4 is a conceptual diagram illustrating another example system for fine-tuning the representation determination component 210 for identifying the functionality groups, according to embodiments of the present disclosure. Pseudo classification is a semi-supervised iterative training process that alternates between two steps: clustering and classification. This pseudo classification fine-tuning step includes use of functionality-labeled data and also other data that is not functionality-labeled. This fine-tuning steps involves: (1) fine-tuning using the labeled training data, (2) attempting to cluster the unlabeled training data, and (3) then using the clustering as input again to fine-tune the model itself. Thus, it is a self-learning approach that involves clustering, and then fine-tuning the model, and repeating the process to continue improving until the model reaches a converged state.

As shown in FIG. 4, as part of the clustering step, a language model component 410 may receive as input user input data 402 and encode the user input data 402 into functionality-based representation vectors (e.g., embedding data 415). In some embodiments, a clustering component 420 may receive the functionality-based representation vectors. The clustering component 420 may group the functionality-based representation vectors into clusters based on the functionality and assign a pseudo-label 422 (corresponding to a functionality) to each cluster.

A clustering algorithm, such as Constrained K-Means (COP-K-Means) algorithm may be used which provides for putting constraints on the clustering process. An example constraint may be identifying which functionality-based representation(s) 212 (and corresponding user input data 402) must be clustered in the same groups and which functionality-based representation(s) 212 must not be clustered in the same groups. A constraint applied for the clustering of the user input data 402 may be that any utterance that is part of the same functionality as identified in the function-labeled training data ($\text{Train}_L$) must be grouped in the same candidate cluster resulting from the COP-K-Means algorithm applied by the clustering component 420.

As shown in FIG. 4 as part of the classifying step, the language model component 410 (e.g., a BERT encoder) may be fine-tuned using functionality classifier component 430. The functionality classifier component 430 may perform a functionality classification task using the pseudo-labels 422 generated from the clustering step. The pseudo-labels 422 may be used as the ground truth functionality labels for the training of the functionality classifier component 430. From the provided pseudo-labels 422, the functionality classifier component 430 may determine functionality labels 432. The fine-tuned language model 410 may be included in the representation determination component 210 for use during runtime/inference processing.

The functionality classifier component 430 may include a dense layer followed by a softmax on top of the encoder. The functionality classifier component 430 may utilize a cluster centroid alignment technique where the pseudo-labels 422 from the clustering step are re-assigned. This may align the pseudo-labels 422 with the pseudo-classifier trained from the previous iteration. The parameters of the functionality classifier component 430 may be reusable across iterations and thus increasing the speed of training. The pseudo-classification illustrated in FIG. 4 may be an improved clustering mechanism as the pseudo-classification may cluster the user input samples of the function-unlabeled training data (Train$_U$) into groups from the function-labeled training data (Train$_L$) or new groups.

FIG. 5 is a conceptual diagram illustrating another example system for fine-tuning the representation determination component 210 for identifying the functionality groups, according to embodiments of the present disclosure. Entity classification may be used as an additional or alternative fine-tuning of the representation determination component 210. For example, a first user input of "Play [song]" and a second user input "Play [song] on Amazon Music" are semantically similar user inputs. The addition of "on Amazon Music" in the second user input indicates a "ServiceName" entity type. The population of the "ServiceName" entity type, such as "ServiceName: Amazon Music", may indicate the existence of fine-grained user functionality of playing a song on a service. This fine-grained functionality is not present in the first user input of "Play [song]".

Entity classification may differ from the functionality similarity and pseudo classification as it does not pull or push the user inputs close to or far away from other user inputs in the embedding space. Instead, the language model component 510 identifies entities in the user inputs and may guide the language model component 510 toward producing functionality-based representations 212 with better separation between identified functionalities. This technique involves including information of the entity label in the training data, and training the model to classify a user input based on the entity type included in the user input.

As shown in FIG. 5, the language model component 510 may receive user input data 502 as input. The output of the language model component 510 may be embedding data 515 that is then provided as input to a multi-class classifier component 520. The multi-class classifier component 520 may be trained to identify the entity types (e.g., entity labels 522) which appear in the user input data 502, such as "SongName" or "ServiceName". The multi-class classifier component 520 may determine the presence of an entity in the user inputs of the user input data 502 but may not determine the position of the entities in the user inputs of the user input data 502. The fine-tuned language model 510 may be included in the representation determination component 210 for use during runtime/inference processing.

In some embodiments, a language model may be fine-tuned using one of the three techniques described above in relation to FIGS. 3, 4 and 5, and the fine-tuned language model may be included in the representation determination component 210. In other embodiments, a language model may be fine-tuned using all three techniques described above in relation to FIGS. 3, 4 and 5. In yet other embodiments, a language model may be fine-tuned using two of the three techniques described above in relation to FIGS. 3, 4 and 5. In some embodiments, the fine-tuning techniques may be applied in a particular order. For example, first the technique of FIG. 3 is applied, then the technique of FIG. 4 and then the technique of FIG. 5. Using the foregoing particular order may be beneficial in some cases given the respective task of the individual fine-tuning techniques. In other embodiments, fine-tuning with utterance similarity (FIG. 3) and slot classification (FIG. 5) jointly, and then applying pseudo classification (FIG. 4) may be performed. The fine-tuning techniques may be applied in another order.

Using the fine-tuning steps, the representation determination component 210 can learn that user inputs corresponding to the same intent may still correspond to different functionalities (because maybe of the entities, the combination of the intent and entities, combination of the entity type and the entities, combination of the domain and the intent, etc.), and based on the user inputs corresponding to different functionalities, the representation determination component 210 generates representation vectors that are different (e.g., farther from each other) within the functionality-aware space.

Figure 6:
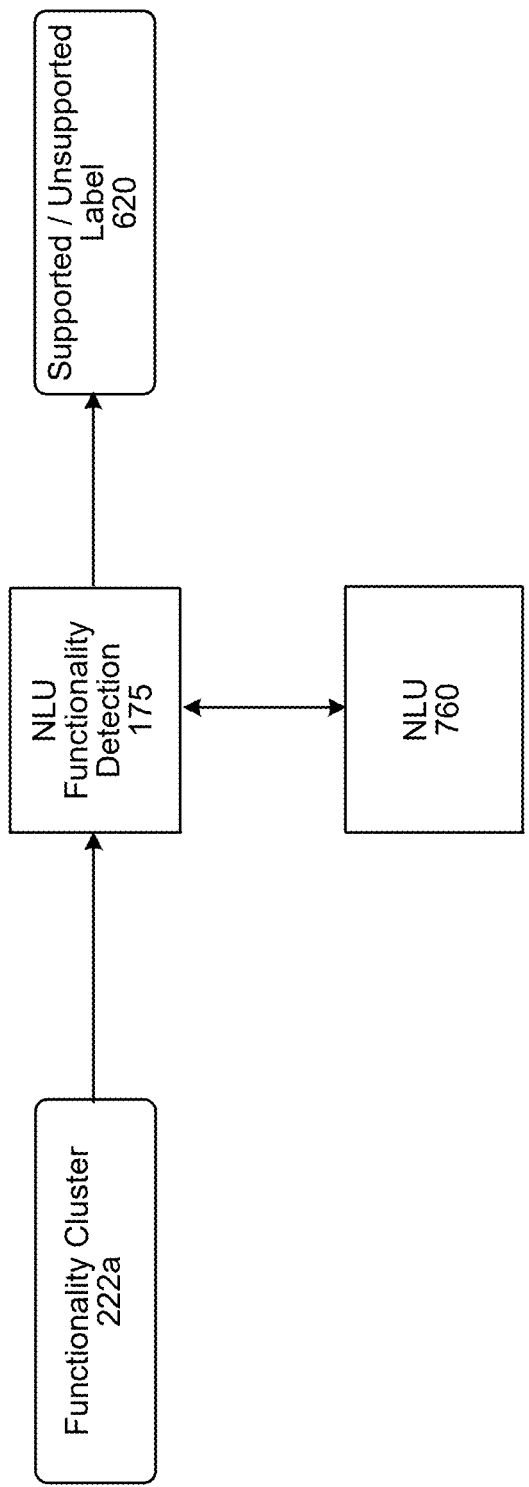
FIG. 6 is a conceptual diagram illustrating components for identifying unsupported functionalities with respect to NLU processing, according to embodiments of the present disclosure.

FIG. 6 is a conceptual diagram illustrating components for identifying unsupported functionalities with respect to NU processing, according to embodiments of the present disclosure. One or more of these components may be included in the supporting device(s) 120. The representation determination component 210 may be used to determine functionality-based representation(s) 212 with respect to the user input data 202, and then the novelty for the functionality with respect to a NU component (e.g., a NLU component 760 shown in FIG. 7) may be determined.

Unsupported functionalities may be identified by leveraging signals of the NLU component 760. The NLU component 760 may be trained to determine, among other things, intent and entity labels for a provided user input. As shown in FIG. 6, the NLU functionality detection component 175 may receive an individual functionality cluster 222a, as determined by the functionality clustering component 220. The NLU functionality detection component 175 may interface with the NLU component 760 to identify supported functionalities. Based on the supported functionalities provided by the NLU component 760, the NLU functionality detection component 175 may identify unsupported functionality labels 620. The supported/unsupported label 620 may indicate whether an associated functionality is supported or unsupported. In other words, an individual functionality (and the group of user inputs corresponding to that functionality) may be associated with the label 620, which may be indicative of a supported or unsupported functionality.

The identification of unsupported functionalities may be determined using confidence scores of NU components in processing the respective user inputs of a group of user inputs corresponding a functionality. For example, a group of user inputs may be processed, individually, using the NLU component 760 to determine confidence scores corresponding to individual user inputs of the group. Based on the confidence scores, either combined or individually, satisfying a condition (e.g., being below a threshold value or above a threshold value, depending on system configuration), the system may determine that the corresponding functionality is unsupported by the NU components.

In some embodiments, the identification of unsupported functionalities may be determined by defining a novelty confidence for a functionality cluster 222. The novelty confidence for a functionality cluster SC={$u_1, u_2, \ldots$} may be defined as the average novelty of the user inputs of the functionality group, as shown in equation (2).

$$func_{novel}(SC_i) = \frac{1}{|sc_i|} \sum_{u \in sc_i} utt_{novel}(u) \qquad \text{Equation (2)}$$

The user input novelty may be computed as shown in equation (3).

$$utt_{novel}(u) = \text{mean}(st_{min}(u), ic(u), pc(u)) \qquad \text{Equation (3)}$$

The slot tagging confidence st may be the confidence determined for the slot tagging. The intent classification confidence may be the confidence of the most probable intent label produced by the intent classifier. The pseudo classification confidence pc may be the confidence of the most probable pseudo label for a cluster from the language model component 410. Functionality clusters satisfying a condition, for example, with a novelty confidence score greater than a pre-defined threshold, may be determined to be unsupported.

The system 100 may operate using various components as described in FIG. 7. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/supporting device 120. In at least some embodiments, such determination may be made using a wakeword detection component 720. The wakeword detection component 720 may be configured to detect various wakewords. In at least some examples, each wakeword may correspond to a name of a different digital assistant. An example wakeword/digital assistant name is "Alexa." In another example, input to the system may be in form of text data 713, for example as a result of a user typing an input into a user interface of device 110. Other input forms may include indication that the user has pressed a physical or virtual button on device 110, the user has made a gesture, etc. The device 110 may also capture images using camera(s) 1218 of the device 110 and may send image data representing those image(s) to the supporting device 120. The image data may include raw image data or image data processed by the device 110 before sending to the supporting device 120. The image data may be used in various manners by different components of the system to perform operations such as determining whether a user is directing an utterance to the system, interpreting a user command, responding to a user command, etc.

The wakeword detector 720 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 720 and/or input is detected by an input detector, the device 110 may "wake" and begin transmitting audio data 711, representing the audio 11, to the supporting device(s) 120. The audio data 711 may include data corresponding to the wakeword; in other embodiments, the portion of the audio corresponding to the wakeword is removed by the device 110 prior to sending the audio data 711 to the supporting device(s) 120. In the case of touch input detection or gesture based input detection, the audio data may not include a wakeword.

In some implementations, the system 100 may include more than one supporting device 120. The supporting devices 120 may respond to different wakewords and/or perform different categories of tasks. Each supporting device 120 may be associated with its own wakeword such that speaking a certain wakeword results in audio data be sent to and processed by a particular system. For example, detection of the wakeword "Alexa" by the wakeword detector 720 may result in sending audio data to supporting device 120a for processing while detection of the wakeword "Computer" by the wakeword detector may result in sending audio data to supporting device 120b for processing. The system may have a separate wakeword and system for different skills/systems (e.g., "Dungeon Master" for a game play skill/supporting device 120c) and/or such skills/systems may be coordinated by one or more skill(s) 790 of one or more supporting devices 120.

Upon receipt by the supporting device(s) 120, the audio data 711 may be sent to an orchestrator component 730. The orchestrator component 730 may include memory and logic that enables the orchestrator component 730 to transmit various pieces and forms of data to various components of the system, as well as perform other operations as described herein.

The orchestrator component 730 may send the audio data 711 to a language processing component 792. The language processing component 792 (sometimes also referred to as a spoken language understanding (SLU) component) includes an automatic speech recognition (ASR) component 750 and a natural language understanding (NLU) component 760. The ASR component 750 may transcribe the audio data 711 into text data. The text data output by the ASR component 750 represents one or more than one (e.g., in the form of an N-best list) ASR hypotheses representing speech represented in the audio data 711. The ASR component 750 interprets the speech in the audio data 711 based on a similarity between the audio data 711 and pre-established language models. For example, the ASR component 750 may compare the audio data 711 with models for sounds (e.g., acoustic units such as phonemes, senons, phones, etc.) and sequences of sounds to identify words that match the sequence of sounds of the speech represented in the audio data 711. The ASR component 750 sends the text data generated thereby to an NLU component 760, via, in some embodiments, the orchestrator component 730. The text data sent from the ASR component 750 to the NLU component 760 may include a single top-scoring ASR hypothesis or may include an N-best list including multiple top-scoring ASR hypotheses. An N-best list may additionally include a respective score associated with each ASR hypothesis represented therein.

The speech processing system 792 may further include a NLU component 760. The NLU component 760 may receive the text data from the ASR component. The NLU component 760 may attempts to make a semantic interpretation of the phrase(s) or statement(s) represented in the text data input therein by determining one or more meanings associated with the phrase(s) or statement(s) represented in the text data. The NLU component 760 may determine an intent representing an action that a user desires be performed and may determine information that allows a device (e.g., the device 110, the supporting device(s) 120, a skill component 790, a skill system(s) 125, etc.) to execute the intent. For example, if the text data corresponds to "play the 5$^{th}$ Symphony by Beethoven," the NLU component 760 may determine an intent that the system output music and may identify "Beethoven" as an artist/composer and "5th Symphony" as the piece of music to be played. For further example, if the text data corresponds to "what is the weather," the NLU component 760 may determine an intent that the system output weather information associated with a geographic location of the device 110. In another example, if the text data corresponds to "turn off the lights," the NLU component 760 may determine an intent that the system turn off lights associated with the device 110 or the user 5. However, if the NLU component 760 is unable to resolve the entity—for example, because the entity is referred to by anaphora such as "this song" or "my next appointment"— the speech processing system 792 can send a decode request to another speech processing system 792 for information regarding the entity mention and/or other context related to the utterance. The speech processing system 792 may augment, correct, or base results data upon the audio data 711 as well as any data received from the other speech processing system 792.

The NLU component 760 may return NLU results data 1085/1025 (which may include tagged text data, indicators of intent, etc.) back to the orchestrator 730. The orchestrator 730 may forward the NLU results data to a skill component(s) 790. If the NLU results data includes a single NLU hypothesis, the NLU component 760 and the orchestrator component 730 may direct the NLU results data to the skill component(s) 790 associated with the NLU hypothesis. If the NLU results data 1085/1025 includes an N-best list of NLU hypotheses, the NLU component 760 and the orchestrator component 730 may direct the top scoring NLU hypothesis to a skill component(s) 790 associated with the top scoring NLU hypothesis. The system may also include a post-NLU ranker 765 which may incorporate other information to rank potential interpretations determined by the NLU component 760. The local device 110 may also include its own post-NLU ranker 865, which may operate similarly to the post-NLU ranker 765. The NLU component 760, post-NLU ranker 765 and other components are described in greater detail below with regard to FIGS. 9 and 10.

A skill component may be software running on the supporting device(s) 120 that is akin to a software application. That is, a skill component 790 may enable the supporting device(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The supporting device(s) 120 may be configured with more than one skill component 790. For example, a weather service skill component may enable the supporting device(s) 120 to provide weather information, a car service skill component may enable the supporting device(s) 120 to book a trip with respect to a taxi or ride sharing service, a restaurant skill component may enable the supporting device(s) 120 to order a pizza with respect to the restaurant's online ordering system, etc. A skill component 790 may operate in conjunction between the supporting device(s) 120 and other devices, such as the device 110, in order to complete certain functions. Inputs to a skill component 790 may come from speech processing interactions or through other interactions or input sources. A skill component 790 may include hardware, software, firmware, or the like that may be dedicated to a particular skill component 790 or shared among different skill components 790.

A skill support system(s) 125 may communicate with a skill component(s) 790 within the supporting device(s) 120 and/or directly with the orchestrator component 730 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the supporting device(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The supporting device(s) 120 may be configured with a skill component 790 dedicated to interacting with the skill support system(s) 125. Unless expressly stated otherwise, reference to a skill, skill device, or skill component may include a skill component 790 operated by the supporting device(s) 120 and/or skill operated by the skill support system(s) 125. Moreover, the functionality described herein as a skill or skill may be referred to using many different terms, such as an action, bot, app, or the like. The skill 790 and or skill support system(s) 125 may return output data to the orchestrator 730.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The supporting device 120 includes a language output component 793. The language output component 793 includes a natural language generation (NLG) component 779 and a text-to-speech (TTS) component 780. The NLG component 779 can generate text for purposes of TTS output to a user. For example, the NLG component 779 may generate text corresponding to instructions corresponding to a particular action for the user to perform. The NLG component 779 may generate appropriate text for various outputs as described herein. The NLG component 779 may include one or more trained models configured to output text appropriate for a particular input. The text output by the NLG component 779 may become input for the TTS component 780 (e.g., output text data discussed below). Alternatively or in addition, the TTS component 780 may receive text data from a skill 790 or other system component for output.

The NLG component 779 may include a trained model. The NLG component 779 generates text data such that the output text data has a natural feel and, in some embodiments, includes words and/or phrases specifically formatted for a requesting individual. The NLG component 779 may use templates to formulate responses. The NLG component 779 may include models trained from the various templates for forming the output text data. For example, the NLG component 779 may analyze transcripts of local news programs, television shows, sporting events, or any other media program to obtain common components of a relevant language and/or region. As one illustrative example, the NLG component 779 may analyze a transcription of a regional sports program to determine commonly used words or phrases for describing scores or other sporting news for a particular region. The NLG component 779 may further receive, as inputs, a dialog history, an indicator of a level of formality, and/or a command history or other user history such as the dialog history.

The NLG component 779 may generate dialog data based on one or more response templates. Further continuing the example above, the NLG component 779 may select a template in response to the question, "What is the weather currently like?" of the form: "The weather currently is $weather_information$." The NLG component 779 may analyze the logical form of the template to produce one or more textual responses including markups and annotations to familiarize the response that is generated. In some embodiments, the NLG component 779 may determine which response is the most appropriate response to be selected. The selection may, therefore, be based on past responses, past questions, a level of formality, and/or any other feature, or any other combination thereof. Responsive audio data representing the response generated by the NLG component 779 may then be generated using the text-to-speech component 780.

The TTS component 780 may generate audio data (e.g., synthesized speech) from text data using one or more different methods. Text data input to the TTS component 780 may come from a skill component 790, the orchestrator component 730, or another component of the system. In one method of synthesis called unit selection, the TTS component 780 matches text data against a database of recorded speech. The TTS component 780 selects matching units of recorded speech and concatenates the units together to form audio data. In another method of synthesis called parametric synthesis, the TTS component 780 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the supporting device(s) 120 as image data. The device 110 may further include circuitry for voice command-based control of the camera, allowing a user 5 to request capture of image or video data. The device 110 may process the commands locally or send audio data 711 representing the commands to the supporting device(s) 120 for processing, after which the supporting device(s) 120 may return output data that can cause the device 110 to engage its camera.

Upon receipt by the supporting device(s) 120, the image data may be sent to an orchestrator component 730. The orchestrator component 730 may send the image data to an image processing component. The image processing component can perform computer vision functions such as object recognition, modeling, reconstruction, etc. For example, the image processing component may detect a person, face, etc. (which may then be identified using user recognition component 795).

In some implementations, the image processing component can detect the presence of text in an image. In such implementations, the image processing component can recognize the presence of text, convert the image data to text data, and send the resulting text data via the orchestrator component 730 to the language processing component 792 for processing by the NLU component 760.

The supporting device(s) 120 may include a user recognition component 795 that recognizes one or more users using a variety of data. However, the disclosure is not limited thereto, and the user device 110 may include a user recognition component 895 instead of and/or in addition to user recognition component 795 of the supporting device(s) 120 without departing from the disclosure. User recognition component 895 operates similarly to user recognition component 795.

The user-recognition component 795 may take as input the audio data 711 and/or text data output by the ASR component 750. The user-recognition component 795 may perform user recognition by comparing audio characteristics in the audio data 711 to stored audio characteristics of users. The user-recognition component 795 may also perform user recognition by comparing biometric data (e.g., fingerprint data, iris data, etc.), received by the system in correlation with the present user input, to stored biometric data of users assuming user permission and previous authorization. The user-recognition component 795 may further perform user recognition by comparing image data (e.g., including a representation of at least a feature of a user), received by the system in correlation with the present user input, with stored image data including representations of features of different users. The user-recognition component 795 may perform additional user recognition processes, including those known in the art.

The user-recognition component 795 determines scores indicating whether user input originated from a particular user. For example, a first score may indicate a likelihood that the user input originated from a first user, a second score may indicate a likelihood that the user input originated from a second user, etc. The user-recognition component 795 also determines an overall confidence regarding the accuracy of user recognition operations.

Output of the user-recognition component 795 may include a single user identifier corresponding to the most likely user that originated the user input. Alternatively, output of the user-recognition component 795 may include an N-best list of user identifiers with respective scores indicating likelihoods of respective users originating the user input. The output of the user-recognition component 795 may be used to inform NLU processing as well as processing performed by other components of the system.

The system 100 (either on device 110, supporting device 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 770 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the supporting device 120 with permission to allow the skill to execute with respect to the user's natural language user inputs. If a user does not enable a skill, the supporting device 120 may not invoke the skill to execute with respect to the user's natural language user inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 8:
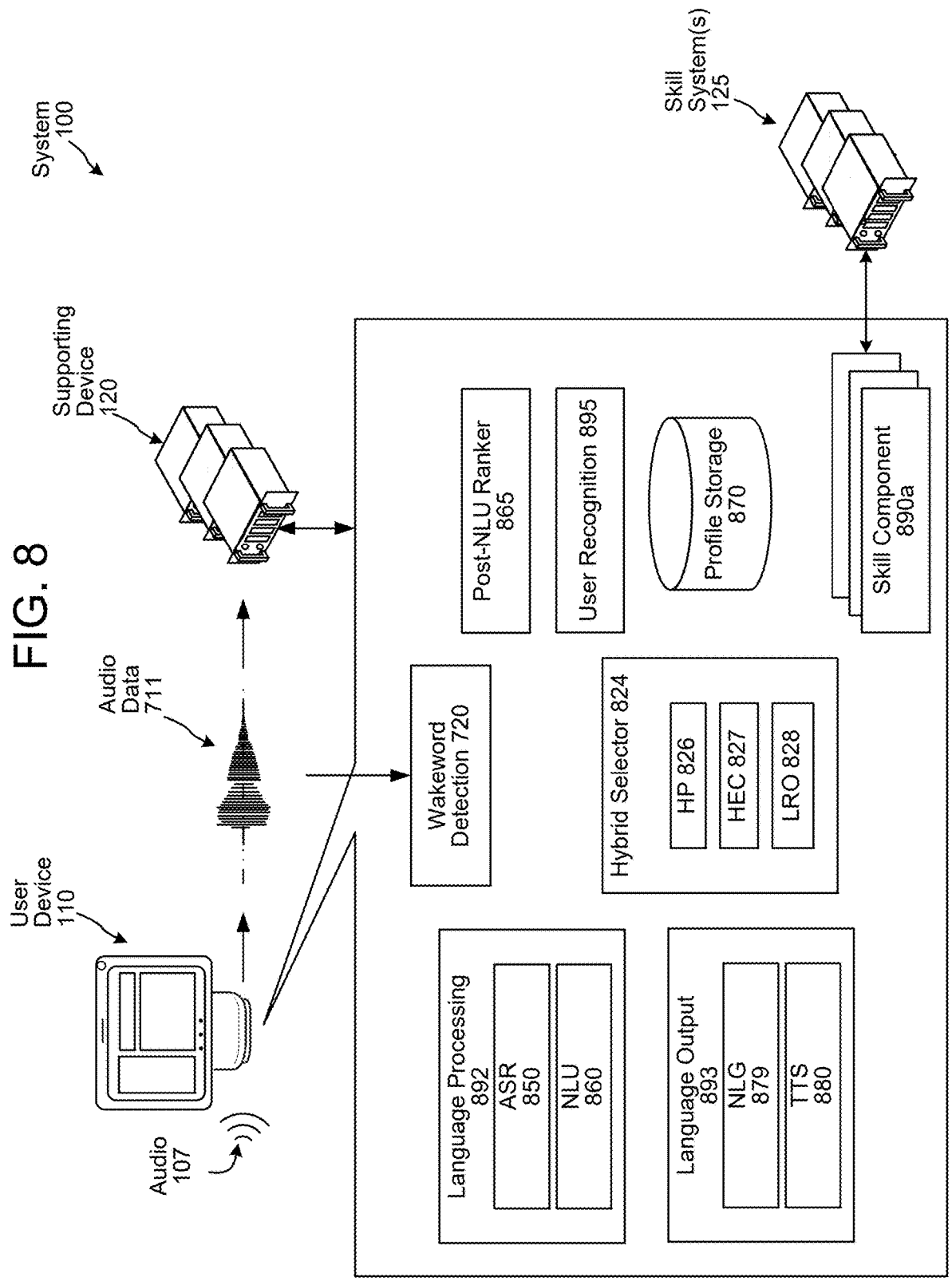
FIG. 8 is a conceptual diagram illustrating components that may be included in a device, according to embodiments of the present disclosure.

Although the components of FIG. 7 may be illustrated as part of supporting device(s) 120, device 110, or otherwise, the components may be arranged in other device(s) (such as in device 110 if illustrated in supporting device(s) 120 or vice-versa, or in other device(s) altogether) without departing from the disclosure. FIG. 8 illustrates such a configured device 110.

In at least some embodiments, the supporting device 120 may receive the audio data 711 from the device 110, to recognize speech corresponding to a spoken input in the received audio data 711, and to perform functions in response to the recognized speech. In at least some embodiments, these functions involve sending directives (e.g., commands), from the supporting device 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the supporting device 120 over the network(s) 199, some or all of the functions capable of being performed by the supporting device 120 may be performed by sending one or more directives over the network(s) 199 to the device 110, which, in turn, may process the directive(s) and perform one or more corresponding actions. For example, the supporting device 120, using a remote directive that is included in response data (e.g., a remote response), may instruct the device 110 to output an audible response (e.g., using TTS processing performed by an on-device TTS component 880) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the supporting device 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 7, the device 110 may include a wakeword detection component 720 configured to compare the audio data 711 to stored models used to detect a wakeword (e.g., "Alexa") that indicates to the device 110 that the audio data 711 is to be processed for determining NLU output data (e.g., slot data that corresponds to a named entity, label data, and/or intent data, etc.). In at least some embodiments, a hybrid selector 824, of the device 110, may send the audio data 711 to the wakeword detection component 720. If the wakeword detection component 720 detects a wakeword in the audio data 711, the wakeword detection component 720 may send an indication of such detection to the hybrid selector 824. In response to receiving the indication, the hybrid selector 824 may send the audio data 711 to the supporting device 120 and/or the ASR component 850. The wakeword detection component 720 may also send an indication, to the hybrid selector 824, representing a wakeword was not detected. In response to receiving such an indication, the hybrid selector 824 may refrain from sending the audio data 711 to the supporting device 120, and may prevent the ASR component 850 from further processing the audio data 711. In this situation, the audio data 711 can be discarded.

The device 110 may conduct its own speech processing using on-device language processing components, such as an SLU/language processing component 892 (which may include an ASR component 850 and an NLU 860), similar to the manner discussed herein with respect to the SLU component 792 (or ASR component 750 and the NLU component 760) of the supporting device 120. Language processing component 892 may operate similarly to language processing component 792, ASR component 850 may operate similarly to ASR component 750 and NLU component 860 may operate similarly to NLU component 760. The device 110 may also internally include, or otherwise have access to, other components such as one or more skill components 890 capable of executing commands based on NLU output data or other results determined by the device 110/supporting device 120 (which may operate similarly to skill components 790), a user recognition component 895 (configured to process in a similar manner to that discussed herein with respect to the user recognition component 795 of the supporting device 120), profile storage 870 (configured to store similar profile data to that discussed herein with respect to the profile storage 770 of the supporting device 120), or other components. In at least some embodiments, the profile storage 870 may only store profile data for a user or group of users specifically associated with the device 110. Similar to as described above with respect to skill component 790, a skill component 890 may communicate with a skill system(s) 125. The device 110 may also have its own language output component 893 which may include NLG component 879 and TTS component 880. Language output component 893 may operate similarly to language output component 793, NLG component 879 may operate similarly to NLG component 779 and TTS component 880 may operate similarly to TTS component 780.

In at least some embodiments, the on-device language processing components may not have the same capabilities as the language processing components of the supporting device 120. For example, the on-device language processing components may be configured to handle only a subset of the natural language user inputs that may be handled by the supporting device 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the supporting device 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the supporting device 120.

The hybrid selector 824, of the device 110, may include a hybrid proxy (HP) 826 configured to proxy traffic to/from the supporting device 120. For example, the HP 826 may be configured to send messages to/from a hybrid execution controller (HEC) 827 of the hybrid selector 824. For example, command/directive data received from the supporting device 120 can be sent to the HEC 827 using the HP 826. The HP 826 may also be configured to allow the audio data 711 to pass to the supporting device 120 while also receiving (e.g., intercepting) this audio data 711 and sending the audio data 711 to the HEC 827.

In at least some embodiments, the hybrid selector 824 may further include a local request orchestrator (LRO) 828 configured to notify the ASR component 850 about the availability of new audio data 711 that represents user speech, and to otherwise initiate the operations of local language processing when new audio data 711 becomes available. In general, the hybrid selector 824 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the supporting device 120 and chooses to use that remotely-determined directive data.

Thus, when the audio data 711 is received, the HP 826 may allow the audio data 711 to pass through to the supporting device 120 and the HP 826 may also input the audio data 711 to the on-device ASR component 850 by routing the audio data 711 through the HEC 827 of the hybrid selector 824, whereby the LRO 828 notifies the ASR component 850 of the audio data 711. At this point, the hybrid selector 824 may wait for response data from either or both of the supporting device 120 or the local language processing components. However, the disclosure is not limited thereto, and in some examples the hybrid selector 824 may send the audio data 711 only to the local ASR component 850 without departing from the disclosure. For example, the device 110 may process the audio data 711 locally without sending the audio data 711 to the supporting device 120.

The local ASR component 850 is configured to receive the audio data 711 from the hybrid selector 824, and to recognize speech in the audio data 711, and the local NLU component 860 is configured to determine a user intent from the recognized speech, and to determine how to act on the user intent by generating NLU output data which may include directive data (e.g., instructing a component to perform an action). Such NLU output data may take a form similar to that as determined by the NLU component 760 of the supporting device 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 860) may be selected as usable to respond to a natural language user input, and local response data may be sent (e.g., local NLU output data, local knowledge base information, internet search results, and/or local directive data) to the hybrid selector 824, such as a "ReadyToExecute" response. The hybrid selector 824 may then determine whether to use directive data from the on-device components to respond to the natural language user input, to use directive data received from the supporting device 120, assuming a remote response is even received (e.g., when the device 110 is able to access the supporting device 120 over the network(s) 199), or to determine output audio requesting additional information from the user 5.

The device 110 and/or the supporting device 120 may associate a unique identifier with each natural language user input. The device 110 may include the unique identifier when sending the audio data 711 to the supporting device 120, and the response data from the supporting device 120 may include the unique identifier to identify which natural language user input the response data corresponds.

In at least some embodiments, the device 110 may include, or be configured to use, one or more skill components 890 that may work similarly to the skill component(s) 790 implemented by the supporting device 120. The skill component(s) 890 may correspond to one or more domains that are used in order to determine how to act on a spoken input in a particular way, such as by outputting a directive that corresponds to the determined intent, and which can be processed to implement the desired operation. The skill component(s) 890 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 890, a skill system 125, or a combination of a skill component 890 and a corresponding skill system 125.

Similar to the manner discussed with regard to FIG. 7, the local device 110 may be configured to recognize multiple different wakewords and/or perform different categories of tasks depending on the wakeword. Such different wakewords may invoke different processing components of local device 110 (not illustrated in FIG. 8). For example, detection of the wakeword "Alexa" by the wakeword detector 720 may result in sending audio data to certain language processing components 892/skills 890 for processing while detection of the wakeword "Computer" by the wakeword detector may result in sending audio data different language processing components 892/skills 890 for processing.

Figure 9:
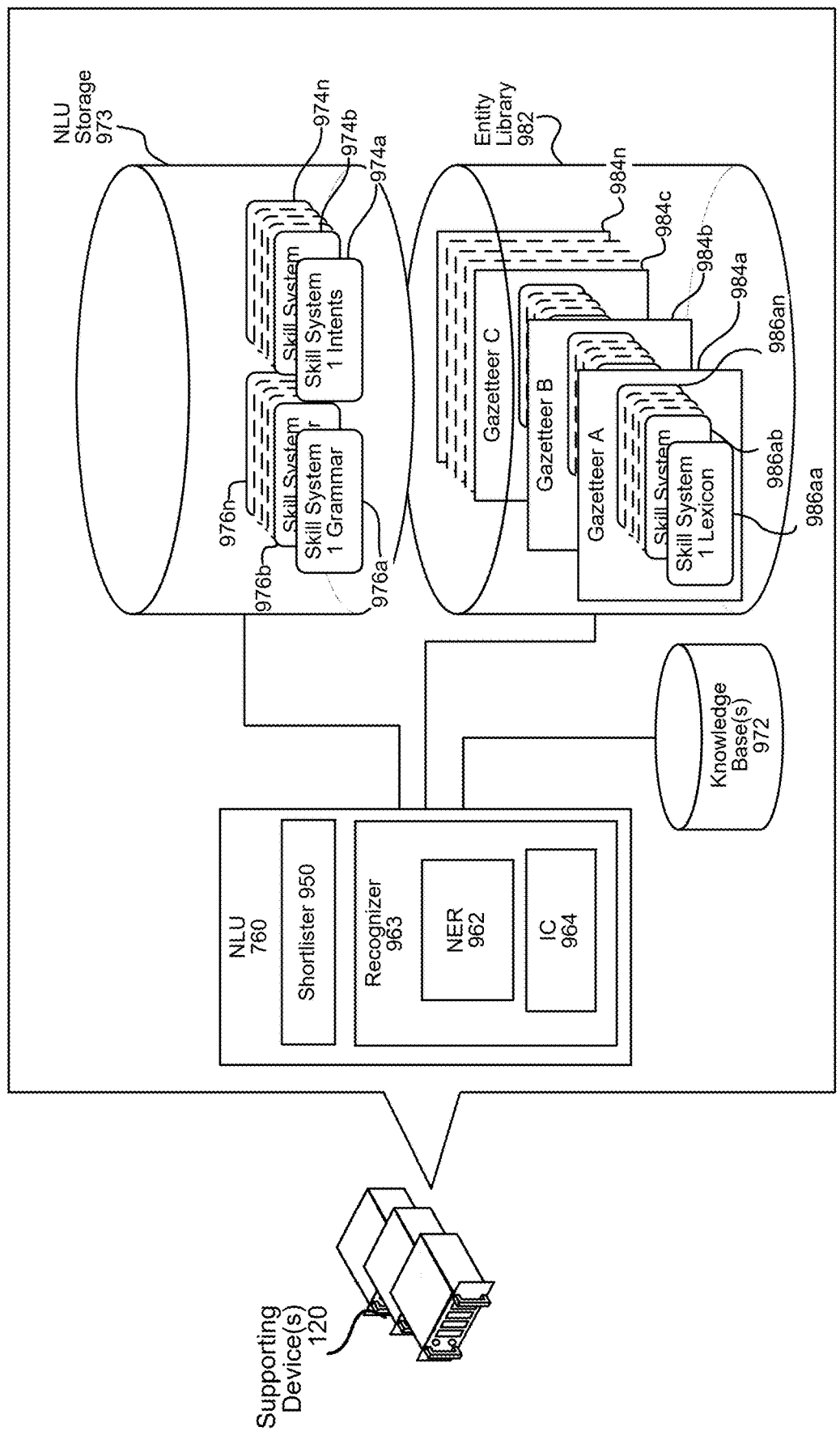
FIG. 9 is a conceptual diagram of how natural language processing is performed, according to embodiments of the present disclosure.
Figure 10:
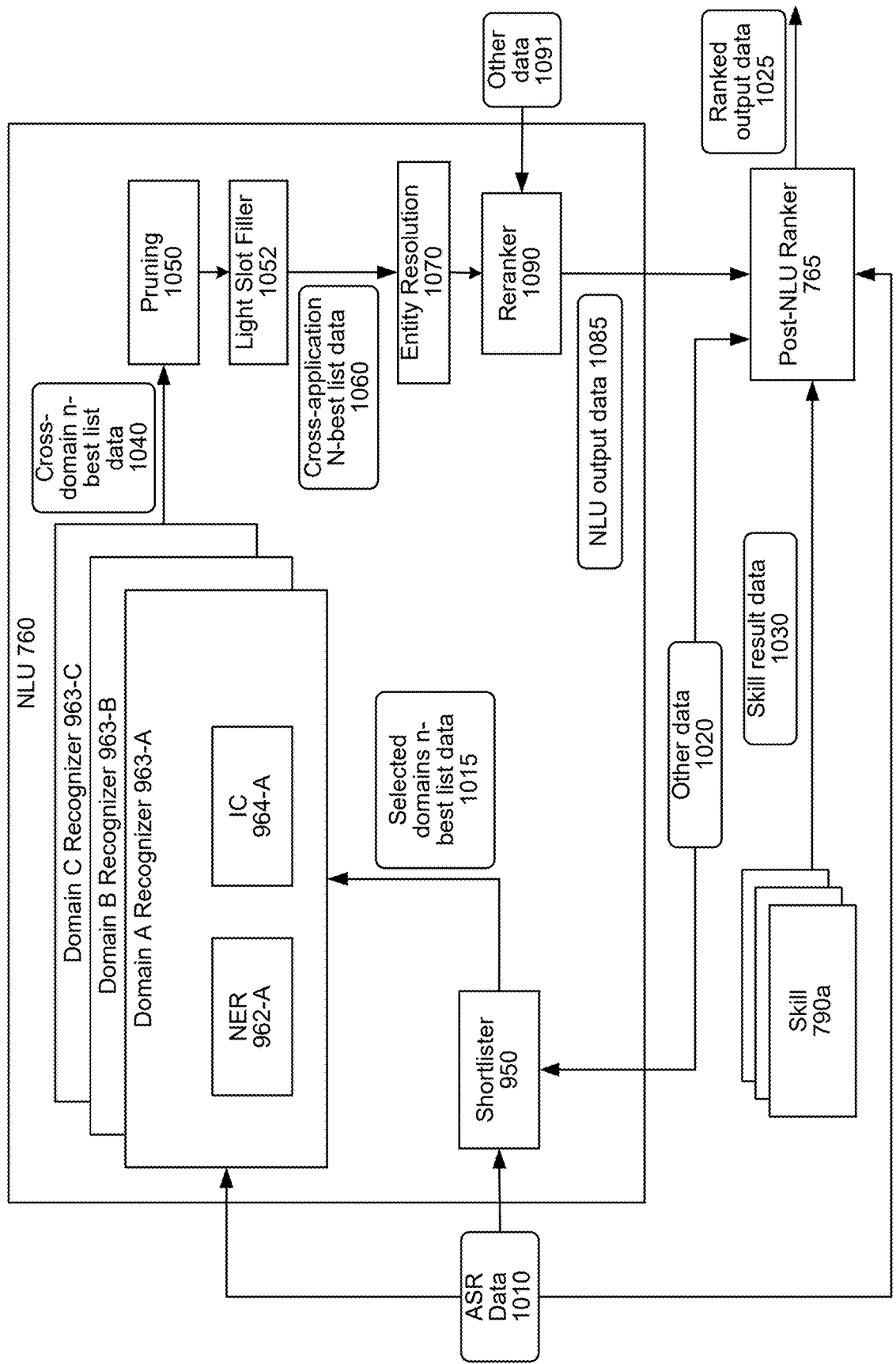
FIG. 10 is a conceptual diagram of how natural language processing is performed, according to embodiments of the present disclosure.

FIGS. 9 and 10 illustrates how the NLU component 760 may perform NLU processing. FIG. 9 is a conceptual diagram of how natural language processing is performed, according to embodiments of the present disclosure. And FIG. 10 is a conceptual diagram of how natural language processing is performed, according to embodiments of the present disclosure.

FIG. 9 illustrates how NLU processing is performed on text data. The NLU component 760 may process text data including several ASR hypotheses of a single user input. For example, if the ASR component 750 outputs text data including an n-best list of ASR hypotheses, the NLU component 760 may process the text data with respect to all (or a portion of) the ASR hypotheses represented therein.

The NLU component 760 may annotate text data by parsing and/or tagging the text data. For example, for the text data "tell me the weather for Seattle," the NLU component 760 may tag "tell me the weather for Seattle" as an <OutputWeather> intent as well as separately tag "Seattle" as a location for the weather information.

The NLU component 760 may include a shortlister component 950. The shortlister component 950 selects skills that may execute with respect to ASR output data 1010 input to the NLU component 760 (e.g., applications that may execute with respect to the user input). The ASR output data 1010 (which may also be referred to as ASR data 1010) may include representations of text of an utterance, such as words, subword units, or the like. The shortlister component 950 thus limits downstream, more resource intensive NLU processes to being performed with respect to skills that may execute with respect to the user input.

Without a shortlister component 950, the NLU component 760 may process ASR output data 1010 input thereto with respect to every skill of the system, either in parallel, in series, or using some combination thereof. By implementing a shortlister component 950, the NLU component 760 may process ASR output data 1010 with respect to only the skills that may execute with respect to the user input. This reduces total compute power and latency attributed to NLU processing.

The shortlister component 950 may include one or more trained models. The model(s) may be trained to recognize various forms of user inputs that may be received by the supporting device(s) 120. For example, during a training period skill system(s) 125 associated with a skill may provide the supporting device(s) 120 with training text data representing sample user inputs that may be provided by a user to invoke the skill. For example, for a ride sharing skill, a skill system(s) 125 associated with the ride sharing skill may provide the supporting device(s) 120 with training text data including text corresponding to "get me a cab to [location]," "get me a ride to [location]," "book me a cab to [location]," "book me a ride to [location]," etc. The one or more trained models that will be used by the shortlister component 950 may be trained, using the training text data representing sample user inputs, to determine other potentially related user input structures that users may try to use to invoke the particular skill. During training, the supporting device(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the supporting device(s) 120 with training text data indicating grammar and annotations. The supporting device(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 950 may be trained with respect to a different skill. Alternatively, the shortlister component 950 may use one trained model per domain, such as one trained model for skills associated with a weather domain, one trained model for skills associated with a ride sharing domain, etc.

The supporting device(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 950. For example, some sample user inputs may be positive examples (e.g., user inputs that may be used to invoke the skill). Other sample user inputs may be negative examples (e.g., user inputs that may not be used to invoke the skill).

As described above, the shortlister component 950 may include a different trained model for each skill of the system, a different trained model for each domain, or some other combination of trained model(s). For example, the shortlister component 950 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 950 to output indications of only a portion of the skills that the ASR output data 1010 may relate to. For example, a user input may correspond to "tell me about Tom Collins." If the model is clustered based on domain, the shortlister component 950 may determine the user input corresponds to a recipe skill (e.g., a drink recipe) even though the user input may also correspond to an information skill (e.g., including information about a person named Tom Collins).

The NLU component 760 may include one or more recognizers 963. In at least some embodiments, a recognizer 963 may be associated with a skill system 125 (e.g., the recognizer may be configured to interpret text data to correspond to the skill system 125). In at least some other examples, a recognizer 963 may be associated with a domain such as smart home, video, music, weather, custom, etc. (e.g., the recognizer may be configured to interpret text data to correspond to the domain).

If the shortlister component 950 determines ASR output data 1010 is potentially associated with multiple domains, the recognizers 963 associated with the domains may process the ASR output data 1010, while recognizers 963 not indicated in the shortlister component 950's output may not process the ASR output data 1010. The "shortlisted" recognizers 963 may process the ASR output data 1010 in parallel, in series, partially in parallel, etc. For example, if ASR output data 1010 potentially relates to both a communications domain and a music domain, a recognizer associated with the communications domain may process the ASR output data 1010 in parallel, or partially in parallel, with a recognizer associated with the music domain processing the ASR output data 1010.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity associated with a domain, associated with the recognizer 963 implementing the NER component 962. The NER component 962 (or other component of the NLU component 760) may also determine whether a word refers to an entity whose identity is not explicitly mentioned in the text data, for example "him," "her," "it" or other anaphora, exophora, or the like.

Each recognizer 963, and more specifically each NER component 962, may be associated with a particular grammar database 976, a particular set of intents/actions 974, and a particular personalized lexicon 986. The grammar databases 976, and intents/actions 974 may be stored in an NLU storage 973. Each gazetteer 984 may include domain/skill-indexed lexical information associated with a particular user and/or device 110. For example, a Gazetteer A (984*a*) includes skill-indexed lexical information 986*aa* to 986*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 962 applies grammar information 976 and lexical information 986 associated with a domain (associated with the recognizer 963 implementing the NER component 962) to determine a mention of one or more entities in text data. In this manner, the NER component 962 identifies "slots" (each corresponding to one or more particular words in text data) that may be useful for later processing. The NER component 962 may also label each slot with a type (e.g., noun, place, city, artist name, song name, etc.).

Each grammar database 976 includes the names of entities (i.e., nouns) commonly found in speech about the particular domain to which the grammar database 976 relates, whereas the lexical information 986 is personalized to the user and/or the device 110 from which the user input originated. For example, a grammar database 976 associated with a shopping domain may include a database of words commonly used when people discuss shopping.

A downstream process called entity resolution (discussed in detail elsewhere herein) links a slot of text data to a specific entity known to the system. To perform entity resolution, the NLU component 760 may utilize gazetteer information (984a-984n) stored in an entity library storage 982. The gazetteer information 984 may be used to match text data (representing a portion of the user input) with text data representing known entities, such as song titles, contact names, etc. Gazetteers 984 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 963 may also include an intent classification (IC) component 964. An IC component 964 parses text data to determine an intent(s) (associated with the domain associated with the recognizer 963 implementing the IC component 964) that potentially represents the user input. An intent represents to an action a user desires be performed. An IC component 964 may communicate with a database 974 of words linked to intents. For example, a music intent database may link words and phrases such as "quiet," "volume off," and "mute" to a <Mute> intent. An IC component 964 identifies potential intents by comparing words and phrases in text data (representing at least a portion of the user input) to the words and phrases in an intents database 974 (associated with the domain that is associated with the recognizer 963 implementing the IC component 964).

The intents identifiable by a specific IC component 964 are linked to domain-specific (i.e., the domain associated with the recognizer 963 implementing the IC component 964) grammar frameworks 976 with "slots" to be filled. Each slot of a grammar framework 976 corresponds to a portion of text data that the system believes corresponds to an entity. For example, a grammar framework 976 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 976 may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model 976 associated with the identified intent.

For example, a grammar model 976 for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon 986 (associated with the domain associated with the recognizer 963 implementing the NER component 962), attempting to match words and phrases in text data the NER component 962 previously tagged as a grammatical object or object modifier with those identified in the lexicon 986.

An NER component 962 may perform semantic tagging, which is the labeling of a word or combination of words according to their type/semantic meaning. An NER component 962 may parse text data using heuristic grammar rules, or a model may be constructed using techniques such as Hidden Markov Models, maximum entropy models, log linear models, conditional random fields (CRF), and the like. For example, an NER component 962 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music domain, which an IC component 964 (also implemented by the music domain recognizer) may determine corresponds to a <PlayMusic> intent. At this stage, no determination has been made as to the meaning of "mother's little helper" or "the rolling stones," but based on grammar rules and models, the NER component 962 has determined the text of these phrases relates to the grammatical object (i.e., entity) of the user input represented in the text data.

An NER component 962 may tag text data to attribute meaning thereto. For example, an NER component 962 may tag "play mother's little helper by the rolling stones" as: {domain} Music, {intent} <PlayMusic>, {artist name} rolling stones, {media type} SONG, and {song title} mother's little helper. For further example, the NER component 962 may tag "play songs by the rolling stones" as: {domain} Music, {intent} <PlayMusic>, {artist name} rolling stones, and {media type} SONG.

The shortlister component 950 may receive ASR output data 1010 output from the ASR component 750 or output from the device 110b (as illustrated in FIG. 10). The ASR component 750 may embed the ASR output data 1010 into a form processable by a trained model(s) using sentence embedding techniques as known in the art. Sentence embedding results in the ASR output data 1010 including text in a structure that enables the trained models of the shortlister component 950 to operate on the ASR output data 1010. For example, an embedding of the ASR output data 1010 may be a vector representation of the ASR output data 1010.

The shortlister component 950 may make binary determinations (e.g., yes or no) regarding which domains relate to the ASR output data 1010. The shortlister component 950 may make such determinations using the one or more trained models described herein above. If the shortlister component 950 implements a single trained model for each domain, the shortlister component 950 may simply run the models that are associated with enabled domains as indicated in a user profile associated with the device 110 and/or user that originated the user input.

The shortlister component 950 may generate n-best list data 1015 representing domains that may execute with respect to the user input represented in the ASR output data 1010. The size of the n-best list represented in the n-best list data 1015 is configurable. In an example, the n-best list data 1015 may indicate every domain of the system as well as contain an indication, for each domain, regarding whether the domain is likely capable to execute the user input represented in the ASR output data 1010. In another example, instead of indicating every domain of the system, the n-best list data 1015 may only indicate the domains that are likely to be able to execute the user input represented in the ASR output data 1010. In yet another example, the shortlister component 950 may implement thresholding such that the n-best list data 1015 may indicate no more than a maximum number of domains that may execute the user input represented in the ASR output data 1010. In an example, the threshold number of domains that may be represented in the n-best list data 1015 is ten. In another example, the domains included in the n-best list data 1015 may be limited by a threshold a score, where only domains indicating a likelihood to handle the user input is above a certain score (as determined by processing the ASR output data 1010 by the shortlister component 950 relative to such domains) are included in the n-best list data 1015.

The ASR output data 1010 may correspond to more than one ASR hypothesis. When this occurs, the shortlister component 950 may output a different n-best list (represented in the n-best list data 1015) for each ASR hypothesis. Alternatively, the shortlister component 950 may output a single n-best list representing the domains that are related to the multiple ASR hypotheses represented in the ASR output data 1010.

As indicated above, the shortlister component 950 may implement thresholding such that an n-best list output therefrom may include no more than a threshold number of entries. If the ASR output data 1010 includes more than one ASR hypothesis, the n-best list output by the shortlister component 950 may include no more than a threshold number of entries irrespective of the number of ASR hypotheses output by the ASR component 750. Alternatively or in addition, the n-best list output by the shortlister component 950 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1010, the shortlister component 950 may generate confidence scores representing likelihoods that domains relate to the ASR output data 1010. If the shortlister component 950 implements a different trained model for each domain, the shortlister component 950 may generate a different confidence score for each individual domain trained model that is run. If the shortlister component 950 runs the models of every domain when ASR output data 1010 is received, the shortlister component 950 may generate a different confidence score for each domain of the system. If the shortlister component 950 runs the models of only the domains that are associated with skills indicated as enabled in a user profile associated with the device 110 and/or user that originated the user input, the shortlister component 950 may only generate a different confidence score for each domain associated with at least one enabled skill. If the shortlister component 950 implements a single trained model with domain specifically trained portions, the shortlister component 950 may generate a different confidence score for each domain who's specifically trained portion is run. The shortlister component 950 may perform matrix vector modification to obtain confidence scores for all domains of the system in a single instance of processing of the ASR output data 1010.

N-best list data 1015 including confidence scores that may be output by the shortlister component 950 may be represented as, for example:

Search domain, 0.67
Recipe domain, 0.62
Information domain, 0.57
Shopping domain, 0.42

As indicated, the confidence scores output by the shortlister component 950 may be numeric values. The confidence scores output by the shortlister component 950 may alternatively be binned values (e.g., high, medium, low).

The n-best list may only include entries for domains having a confidence score satisfying (e.g., equaling or exceeding) a minimum threshold confidence score. Alternatively, the shortlister component 950 may include entries for all domains associated with user enabled skills, even if one or more of the domains are associated with confidence scores that do not satisfy the minimum threshold confidence score.

The shortlister component 950 may consider other data 1020 when determining which domains may relate to the user input represented in the ASR output data 1010 as well as respective confidence scores. The other data 1020 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1020 may include an indicator of the user associated with the ASR output data 1010, for example as determined by the user recognition component 795.

The other data 1020 may be character embedded prior to being input to the shortlister component 950. The other data 1020 may alternatively be embedded using other techniques known in the art prior to being input to the shortlister component 950.

The other data 1020 may also include data indicating the domains associated with skills that are enabled with respect to the device 110 and/or user that originated the user input. The shortlister component 950 may use such data to determine which domain-specific trained models to run. That is, the shortlister component 950 may determine to only run the trained models associated with domains that are associated with user-enabled skills. The shortlister component 950 may alternatively use such data to alter confidence scores of domains.

As an example, considering two domains, a first domain associated with at least one enabled skill and a second domain not associated with any user-enabled skills of the user that originated the user input, the shortlister component 950 may run a first model specific to the first domain as well as a second model specific to the second domain. Alternatively, the shortlister component 950 may run a model configured to determine a score for each of the first and second domains. The shortlister component 950 may determine a same confidence score for each of the first and second domains in the first instance. The shortlister component 950 may then alter those confidence scores based on which domains is associated with at least one skill enabled by the present user. For example, the shortlister component 950 may increase the confidence score associated with the domain associated with at least one enabled skill while leaving the confidence score associated with the other domain the same. Alternatively, the shortlister component 950 may leave the confidence score associated with the domain associated with at least one enabled skill the same while decreasing the confidence score associated with the other domain. Moreover, the shortlister component 950 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 770. When the shortlister component 950 receives the ASR output data 1010, the shortlister component 950 may determine whether profile data associated with the user and/or device 110 that originated the command includes an indication of enabled skills.

The other data 1020 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 950 may use such data to determine which domain-specific trained models to run. For example, if the device 110 corresponds to a displayless type device, the shortlister component 950 may determine not to run trained models specific to domains that output video data. The shortlister component 950 may alternatively use such data to alter confidence scores of domains.

As an example, considering two domains, one that outputs audio data and another that outputs video data, the shortlister component 950 may run a first model specific to the domain that generates audio data as well as a second model specific to the domain that generates video data. Alternatively the shortlister component 950 may run a model configured to determine a score for each domain. The shortlister component 950 may determine a same confidence score for each of the domains in the first instance. The shortlister component 950 may then alter the original confidence scores based on the type of the device 110 that originated the user input corresponding to the ASR output data 1010. For example, if the device 110 is a displayless device, the shortlister component 950 may increase the confidence score associated with the domain that generates audio data while leaving the confidence score associated with the domain that generates video data the same. Alternatively, if the device 110 is a displayless device, the shortlister component 950 may leave the confidence score associated with the domain that generates audio data the same while decreasing the confidence score associated with the domain that generates video data. Moreover, if the device 110 is a displayless device, the shortlister component 950 may increase the confidence score associated with the domain that generates audio data as well as decrease the confidence score associated with the domain that generates video data.

The type of device information represented in the other data 1020 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1020 may represent the smart TV of other display device, and not the displayless device that captured the spoken user input.

The other data 1020 may also include data indicating the user input originating device's speed, location, or other mobility information. For example, the device may correspond to a vehicle including a display. If the vehicle is moving, the shortlister component 950 may decrease the confidence score associated with a domain that generates video data as it may be undesirable to output video content to a user while the user is driving. The device may output data to the supporting device(s) 120 indicating when the device is moving.

The other data 1020 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 950 may use such data to alter confidence scores of domains. For example, the shortlister component 950 may run a first model specific to a first domain as well as a second model specific to a second domain. Alternatively, the shortlister component 950 may run a model configured to determine a score for each domain. The shortlister component 950 may also determine a same confidence score for each of the domains in the first instance. The shortlister component 950 may then alter the original confidence scores based on the first domain being invoked to cause the system to output content while the current user input was received. Based on the first domain being invoked, the shortlister component 950 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1015 generated by the shortlister component 950 as well as the different types of other data 1020 considered by the shortlister component 950 are configurable. For example, the shortlister component 950 may update confidence scores as more other data 1020 is considered. For further example, the n-best list data 1015 may exclude relevant domains if thresholding is implemented. Thus, for example, the shortlister component 950 may include an indication of a domain in the n-best list 1015 unless the shortlister component 950 is one hundred percent confident that the domain may not execute the user input represented in the ASR output data 1010 (e.g., the shortlister component 950 determines a confidence score of zero for the domain).

The shortlister component 950 may send the ASR output data 1010 to recognizers 963 associated with domains represented in the n-best list data 1015. Alternatively, the shortlister component 950 may send the n-best list data 1015 or some other indicator of the selected subset of domains to another component (such as the orchestrator component 730) which may in turn send the ASR output data 1010 to the recognizers 963 corresponding to the domains included in the n-best list data 1015 or otherwise indicated in the indicator. If the shortlister component 950 generates an n-best list representing domains without any associated confidence scores, the shortlister component 950/orchestrator component 730 may send the ASR output data 1010 to recognizers 963 associated with domains that the shortlister component 950 determines may execute the user input. If the shortlister component 950 generates an n-best list representing domains with associated confidence scores, the shortlister component 950/orchestrator component 730 may send the ASR output data 1010 to recognizers 963 associated with domains associated with confidence scores satisfying (e.g., meeting or exceeding) a threshold minimum confidence score.

A recognizer 963 may output tagged text data generated by an NER component 962 and an IC component 964, as described herein above. The NLU component 760 may compile the output tagged text data of the recognizers 963 into a single cross-domain n-best list 1040 and may send the cross-domain n-best list 1040 to a pruning component 1050. Each entry of tagged text (e.g., each NLU hypothesis) represented in the cross-domain n-best list data 1040 may be associated with a respective score indicating a likelihood that the NLU hypothesis corresponds to the domain associated with the recognizer 963 from which the NLU hypothesis was output. For example, the cross-domain n-best list data 1040 may be represented as (with each line corresponding to a different NLU hypothesis):

[0.95] Intent: <PlayMusic> ArtistName: Beethoven Song-Name: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1050 may sort the NLU hypotheses represented in the cross-domain n-best list data 1040 according to their respective scores. The pruning component 1050 may perform score thresholding with respect to the cross-domain NLU hypotheses. For example, the pruning component 1050 may select NLU hypotheses associated with scores satisfying (e.g., meeting and/or exceeding) a threshold score. The pruning component 1050 may also or alternatively perform number of NLU hypothesis thresholding. For example, the pruning component 1050 may select the top scoring NLU hypothesis(es). The pruning component 1050 may output a portion of the NLU hypotheses input thereto. The purpose of the pruning component 1050 is to create a reduced list of NLU hypotheses so that downstream, more resource intensive, processes may only operate on the NLU hypotheses that most likely represent the user's intent.

The NLU component 760 may include a light slot filler component 1052. The light slot filler component 1052 can take text from slots represented in the NLU hypotheses output by the pruning component 1050 and alter them to make the text more easily processed by downstream components. The light slot filler component 1052 may perform low latency operations that do not involve heavy operations such as reference to a knowledge base (e.g., 972. The purpose of the light slot filler component 1052 is to replace words with other words or values that may be more easily understood by downstream components. For example, if a NLU hypothesis includes the word "tomorrow," the light slot filler component 1052 may replace the word "tomorrow" with an actual date for purposes of downstream processing. Similarly, the light slot filler component 1052 may replace the word "CD" with "album" or the words "compact disc." The replaced words are then included in the cross-domain n-best list data 1060.

The cross-domain n-best list data 1060 may be input to an entity resolution component 1070. The entity resolution component 1070 can apply rules or other instructions to standardize labels or tokens from previous stages into an intent/slot representation. The precise transformation may depend on the domain. For example, for a travel domain, the entity resolution component 1070 may transform text corresponding to "Boston airport" to the standard BOS three-letter code referring to the airport. The entity resolution component 1070 can refer to a knowledge base (e.g., 972) that is used to specifically identify the precise entity referred to in each slot of each NLU hypothesis represented in the cross-domain n-best list data 1060. Specific intent/slot combinations may also be tied to a particular source, which may then be used to resolve the text. In the example "play songs by the stones," the entity resolution component 1070 may reference a personal music catalog, Amazon Music account, a user profile, or the like. The entity resolution component 1070 may output an altered n-best list that is based on the cross-domain n-best list 1060 but that includes more detailed information (e.g., entity IDs) about the specific entities mentioned in the slots and/or more detailed slot data that can eventually be used by a skill. The NLU component 760 may include multiple entity resolution components 1070 and each entity resolution component 1070 may be specific to one or more domains.

The NLU component 760 may include a reranker 1090. The reranker 1090 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1070.

The reranker 1090 may apply re-scoring, biasing, or other techniques. The reranker 1090 may consider not only the data output by the entity resolution component 1070, but may also consider other data 1091. The other data 1091 may include a variety of information. For example, the other data 1091 may include skill rating or popularity data. For example, if one skill has a high rating, the reranker 1090 may increase the score of a NLU hypothesis that may be processed by the skill. The other data 1091 may also include information about skills that have been enabled by the user that originated the user input. For example, the reranker 1090 may assign higher scores to NLU hypothesis that may be processed by enabled skills than NLU hypothesis that may be processed by non-enabled skills. The other data 1091 may also include data indicating user usage history, such as if the user that originated the user input regularly uses a particular skill or does so at particular times of day. The other data 1091 may additionally include data indicating date, time, location, weather, type of device 110, user identifier, context, as well as other information. For example, the reranker 1090 may consider when any particular skill is currently active (e.g., music being played, a game being played, etc.).

As illustrated and described, the entity resolution component 1070 is implemented prior to the reranker 1090. The entity resolution component 1070 may alternatively be implemented after the reranker 1090. Implementing the entity resolution component 1070 after the reranker 1090 limits the NLU hypotheses processed by the entity resolution component 1070 to only those hypotheses that successfully pass through the reranker 1090.

The reranker 1090 may be a global reranker (e.g., one that is not specific to any particular domain). Alternatively, the NLU component 760 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 760 may perform NLU processing described above with respect to domains associated with skills wholly implemented as part of the supporting device(s) 120 (e.g., designated 790 in FIG. 7). The NLU component 760 may separately perform NLU processing described above with respect to domains associated with skills that are at least partially implemented as part of the skill system(s) 125. In an example, the shortlister component 950 may only process with respect to these latter domains. Results of these two NLU processing paths may be merged into NLU output data 1085, which may be sent to a post-NLU ranker 765, which may be implemented by the supporting device(s) 120.

The post-NLU ranker 765 may include a statistical component that produces a ranked list of intent/skill pairs with associated confidence scores. Each confidence score may indicate an adequacy of the skill's execution of the intent with respect to NLU results data associated with the skill. The post-NLU ranker 765 may operate one or more trained models configured to process the NLU results data 1085, skill result data 1030, and the other data 1020 in order to output ranked output data 1025. The ranked output data 1025 may include an n-best list where the NLU hypotheses in the NLU results data 1085 are reordered such that the n-best list in the ranked output data 1025 represents a prioritized list of skills to respond to a user input as determined by the post-NLU ranker 765. The ranked output data 1025 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 765 enables the system to better determine the best skill to execute the user input. For example, first and second NLU hypotheses in the NLU results data 1085 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 765 (or other scheduling component such as orchestrator component 730) may solicit the first skill and the second skill to provide potential result data 1030 based on the first NLU hypothesis and the second NLU hypothesis, respectively. For example, the post-NLU ranker 765 may send the first NLU hypothesis to the first skill 790a along with a request for the first skill 790a to at least partially execute with respect to the first NLU hypothesis. The post-NLU ranker 765 may also send the second NLU hypothesis to the second skill 790b along with a request for the second skill 790b to at least partially execute with respect to the second NLU hypothesis. The post-NLU ranker 765 receives, from the first skill 790a, first result data 1030a generated from the first skill 790a's execution with respect to the first NLU hypothesis. The post-NLU ranker 765 also receives, from the second skill 790b, second results data 1030b generated from the second skill 790b's execution with respect to the second NLU hypothesis.

The result data 1030 may include various portions. For example, the result data 1030 may include content (e.g., audio data, text data, and/or video data) to be output to a user. The result data 1030 may also include a unique identifier used by the supporting device(s) 120 and/or the skill system(s) 125 to locate the data to be output to a user. The result data 1030 may also include an instruction. For example, if the user input corresponds to "turn on the light," the result data 1030 may include an instruction causing the system to turn on a light associated with a profile of the device (110a/110b) and/or user.

The post-NLU ranker 765 may consider the first result data 1030a and the second result data 1030b to alter the first confidence score and the second confidence score of the first NLU hypothesis and the second NLU hypothesis, respectively. That is, the post-NLU ranker 765 may generate a third confidence score based on the first result data 1030a and the first confidence score. The third confidence score may correspond to how likely the post-NLU ranker 765 determines the first skill will correctly respond to the user input. The post-NLU ranker 765 may also generate a fourth confidence score based on the second result data 1030b and the second confidence score. One skilled in the art will appreciate that a first difference between the third confidence score and the fourth confidence score may be greater than a second difference between the first confidence score and the second confidence score. The post-NLU ranker 765 may also consider the other data 1020 to generate the third confidence score and the fourth confidence score. While it has been described that the post-NLU ranker 765 may alter the confidence scores associated with first and second NLU hypotheses, one skilled in the art will appreciate that the post-NLU ranker 765 may alter the confidence scores of more than two NLU hypotheses. The post-NLU ranker 765 may select the result data 1030 associated with the skill 790 with the highest altered confidence score to be the data output in response to the current user input. The post-NLU ranker 765 may also consider the ASR output data 1010 to alter the NLU hypotheses confidence scores.

The orchestrator component 730 may, prior to sending the NLU results data 1085 to the post-NLU ranker 765, associate intents in the NLU hypotheses with skills 790. For example, if a NLU hypothesis includes a <PlayMusic> intent, the orchestrator component 730 may associate the NLU hypothesis with one or more skills 790 that can execute the <PlayMusic> intent. Thus, the orchestrator component 730 may send the NLU results data 1085, including NLU hypotheses paired with skills 790, to the post-NLU ranker 765. In response to ASR output data 1010 corresponding to "what should I do for dinner today," the orchestrator component 730 may generates pairs of skills 790 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 765 queries each skill 790, paired with a NLU hypothesis in the NLU output data 1085, to provide result data 1030 based on the NLU hypothesis with which it is associated. That is, with respect to each skill, the post-NLU ranker 765 colloquially asks each skill "if given this NLU hypothesis, what would you do with it." According to the above example, the post-NLU ranker 765 may send skills 790 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 765 may query each of the skills 790 in parallel or substantially in parallel.

A skill 790 may provide the post-NLU ranker 765 with various data and indications in response to the post-NLU ranker 765 soliciting the skill 790 for result data 1030. A skill 790 may simply provide the post-NLU ranker 765 with an indication of whether or not the skill can execute with respect to the NLU hypothesis it received. A skill 790 may also or alternatively provide the post-NLU ranker 765 with output data generated based on the NLU hypothesis it received. In some situations, a skill 790 may need further information in addition to what is represented in the received NLU hypothesis to provide output data responsive to the user input. In these situations, the skill 790 may provide the post-NLU ranker 765 with result data 1030 indicating slots of a framework that the skill 790 further needs filled or entities that the skill 790 further needs resolved prior to the skill 790 being able to provided result data 1030 responsive to the user input. The skill 790 may also provide the post-NLU ranker 765 with an instruction and/or computer-generated speech indicating how the skill 790 recommends the system solicit further information needed by the skill 790. The skill 790 may further provide the post-NLU ranker 765 with an indication of whether the skill 790 will have all needed information after the user provides additional information a single time, or whether the skill 790 will need the user to provide various kinds of additional information prior to the skill 790 having all needed information. According to the above example, skills 790 may provide the post-NLU ranker 765 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1030 includes an indication provided by a skill 790 indicating whether or not the skill 790 can execute with respect to a NLU hypothesis; data generated by a skill 790 based on a NLU hypothesis; as well as an indication provided by a skill 790 indicating the skill 790 needs further information in addition to what is represented in the received NLU hypothesis.

The post-NLU ranker 765 uses the result data 1030 provided by the skills 790 to alter the NLU processing confidence scores generated by the reranker 1090. That is, the post-NLU ranker 765 uses the result data 1030 provided by the queried skills 790 to create larger differences between the NLU processing confidence scores generated by the reranker 1090. Without the post-NLU ranker 765, the system may not be confident enough to determine an output in response to a user input, for example when the NLU hypotheses associated with multiple skills are too close for the system to confidently determine a single skill 790 to invoke to respond to the user input. For example, if the system does not implement the post-NLU ranker 765, the system may not be able to determine whether to obtain output data from a general reference information skill or a medical information skill in response to a user input corresponding to "what is acne."

The post-NLU ranker 765 may prefer skills 790 that provide result data 1030 responsive to NLU hypotheses over skills 790 that provide result data 1030 corresponding to an indication that further information is needed, as well as skills 790 that provide result data 1030 indicating they can provide multiple responses to received NLU hypotheses. For example, the post-NLU ranker 765 may generate a first score for a first skill 790a that is greater than the first skill's NLU confidence score based on the first skill 790a providing result data 1030a including a response to a NLU hypothesis. For further example, the post-NLU ranker 765 may generate a second score for a second skill 790b that is less than the second skill's NLU confidence score based on the second skill 790b providing result data 1030b indicating further information is needed for the second skill 790b to provide a response to a NLU hypothesis. Yet further, for example, the post-NLU ranker 765 may generate a third score for a third skill 790c that is less than the third skill's NLU confidence score based on the third skill 790c providing result data 1030c indicating the third skill 790c can provide multiple responses to a NLU hypothesis.

The post-NLU ranker 765 may consider other data 1020 in determining scores. The other data 1020 may include rankings associated with the queried skills 790. A ranking may be a system ranking or a user-specific ranking. A ranking may indicate a veracity of a skill from the perspective of one or more users of the system. For example, the post-NLU ranker 765 may generate a first score for a first skill 790a that is greater than the first skill's NLU processing confidence score based on the first skill 790a being associated with a high ranking. For further example, the post-NLU ranker 765 may generate a second score for a second skill 790b that is less than the second skill's NLU processing confidence score based on the second skill 790b being associated with a low ranking.

The other data 1020 may include information indicating whether or not the user that originated the user input has enabled one or more of the queried skills 790. For example, the post-NLU ranker 765 may generate a first score for a first skill 790a that is greater than the first skill's NLU processing confidence score based on the first skill 790a being enabled by the user that originated the user input. For further example, the post-NLU ranker 765 may generate a second score for a second skill 790b that is less than the second skill's NLU processing confidence score based on the second skill 790b not being enabled by the user that originated the user input. When the post-NLU ranker 765 receives the NLU results data 1085, the post-NLU ranker 765 may determine whether profile data, associated with the user and/or device that originated the user input, includes indications of enabled skills.

The other data 1020 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 765 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 765 may increase the NLU processing confidence score associated with a first skill configured to output visual data and/or decrease the NLU processing confidence score associated with a second skill configured to output audio data.

The other data 1020 may include information indicating the veracity of the result data 1030 provided by a skill 790. For example, if a user says "tell me a recipe for pasta sauce," a first skill 790a may provide the post-NLU ranker 765 with first result data 1030a corresponding to a first recipe associated with a five star rating and a second skill 790b may provide the post-NLU ranker 765 with second result data 1030b corresponding to a second recipe associated with a one star rating. In this situation, the post-NLU ranker 765 may increase the NLU processing confidence score associated with the first skill 790a based on the first skill 790a providing the first result data 1030a associated with the five star rating and/or decrease the NLU processing confidence score associated with the second skill 790b based on the second skill 790b providing the second result data 1030b associated with the one star rating.

The other data 1020 may include information indicating the type of device that originated the user input. For example, the device may correspond to a "hotel room" type if the device is located in a hotel room. If a user inputs a command corresponding to "order me food" to the device located in the hotel room, the post-NLU ranker 765 may increase the NLU processing confidence score associated with a first skill 790a corresponding to a room service skill associated with the hotel and/or decrease the NLU processing confidence score associated with a second skill 790b corresponding to a food skill not associated with the hotel.

The other data 1020 may include information indicating a location of the device and/or user that originated the user input. The system may be configured with skills 790 that may only operate with respect to certain geographic locations. For example, a user may provide a user input corresponding to "when is the next train to Portland." A first skill 790a may operate with respect to trains that arrive at, depart from, and pass through Portland, Oregon. A second skill 790b may operate with respect to trains that arrive at, depart from, and pass through Portland, Maine. If the device and/or user that originated the user input is located in Seattle, Washington, the post-NLU ranker 765 may increase the NLU processing confidence score associated with the first skill 790a and/or decrease the NLU processing confidence score associated with the second skill 790b. Likewise, if the device and/or user that originated the user input is located in Boston, Massachusetts, the post-NLU ranker 765 may increase the NLU processing confidence score associated with the second skill 790b and/or decrease the NLU processing confidence score associated with the first skill 790a.

The other data 1020 may include information indicating a time of day. The system may be configured with skills 790 that operate with respect to certain times of day. For example, a user may provide a user input corresponding to "order me food." A first skill 790a may generate first result data 1030a corresponding to breakfast. A second skill 790b may generate second result data 1030b corresponding to dinner. If the supporting device(s) 120 receives the user input in the morning, the post-NLU ranker 765 may increase the NLU processing confidence score associated with the first skill 790a and/or decrease the NLU processing score associated with the second skill 790b. If the supporting device(s) 120 receives the user input in the afternoon or evening, the post-NLU ranker 765 may increase the NLU processing confidence score associated with the second skill 790b and/or decrease the NLU processing confidence score associated with the first skill 790a.

The other data 1020 may include information indicating user preferences. The system may include multiple skills 790 configured to execute in substantially the same manner. For example, a first skill 790a and a second skill 790b may both be configured to order food from respective restaurants. The system may store a user preference (e.g., in the profile storage 770) that is associated with the user that provided the user input to the supporting device(s) 120 as well as indicates the user prefers the first skill 790a over the second skill 790b. Thus, when the user provides a user input that may be executed by both the first skill 790a and the second skill 790b, the post-NLU ranker 765 may increase the NLU processing confidence score associated with the first skill 790a and/or decrease the NLU processing confidence score associated with the second skill 790b.

The other data 1020 may include information indicating system usage history associated with the user that originated the user input. For example, the system usage history may indicate the user originates user inputs that invoke a first skill 790a more often than the user originates user inputs that invoke a second skill 790b. Based on this, if the present user input may be executed by both the first skill 790a and the second skill 790b, the post-NLU ranker 765 may increase the NLU processing confidence score associated with the first skill 790a and/or decrease the NLU processing confidence score associated with the second skill 790b.

The other data 1020 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 765 may increase the NLU processing confidence score associated with a first skill 790a that generates audio data. The post-NLU ranker 765 may also or alternatively decrease the NLU processing confidence score associated with a second skill 790b that generates image data or video data.

The other data 1020 may include information indicating how long it took a skill 790 to provide result data 1030 to the post-NLU ranker 765. When the post-NLU ranker 765 multiple skills 790 for result data 1030, the skills 790 may respond to the queries at different speeds. The post-NLU ranker 765 may implement a latency budget. For example, if the post-NLU ranker 765 determines a skill 790 responds to the post-NLU ranker 765 within a threshold amount of time from receiving a query from the post-NLU ranker 765, the post-NLU ranker 765 may increase the NLU processing confidence score associated with the skill 790. Conversely, if the post-NLU ranker 765 determines a skill 790 does not respond to the post-NLU ranker 765 within a threshold amount of time from receiving a query from the post-NLU ranker 765, the post-NLU ranker 765 may decrease the NLU processing confidence score associated with the skill 790.

It has been described that the post-NLU ranker 765 uses the other data 1020 to increase and decrease NLU processing confidence scores associated with various skills 790 that the post-NLU ranker 765 has already requested result data from. Alternatively, the post-NLU ranker 765 may use the other data 1020 to determine which skills 790 to request result data from. For example, the post-NLU ranker 765 may use the other data 1020 to increase and/or decrease NLU processing confidence scores associated with skills 790 associated with the NLU results data 1085 output by the NLU component 760. The post-NLU ranker 765 may select n-number of top scoring altered NLU processing confidence scores. The post-NLU ranker 765 may then request result data 1030 from only the skills 790 associated with the selected n-number of NLU processing confidence scores.

As described, the post-NLU ranker 765 may request result data 1030 from all skills 790 associated with the NLU results data 1085 output by the NLU component 760. Alternatively, the supporting device(s) 120 may prefer result data 1030 from skills implemented entirely by the supporting device(s) 120 rather than skills at least partially implemented by the skill system(s) 125. Therefore, in the first instance, the post-NLU ranker 765 may request result data 1030 from only skills associated with the NLU results data 1085 and entirely implemented by the supporting device(s) 120. The post-NLU ranker 765 may only request result data 1030 from skills associated with the NLU results data 1085, and at least partially implemented by the skill system(s) 125, if none of the skills, wholly implemented by the supporting device(s) 120, provide the post-NLU ranker 765 with result data 1030 indicating either data response to the NLU results data 1085, an indication that the skill can execute the user input, or an indication that further information is needed.

As indicated above, the post-NLU ranker 765 may request result data 1030 from multiple skills 790. If one of the skills 790 provides result data 1030 indicating a response to a NLU hypothesis and the other skills provide result data 1030 indicating either they cannot execute or they need further information, the post-NLU ranker 765 may select the result data 1030 including the response to the NLU hypothesis as the data to be output to the user. If more than one of the skills 790 provides result data 1030 indicating responses to NLU hypotheses, the post-NLU ranker 765 may consider the other data 1020 to generate altered NLU processing confidence scores, and select the result data 1030 of the skill associated with the greatest score as the data to be output to the user.

A system that does not implement the post-NLU ranker 765 may select the highest scored NLU hypothesis in the NLU results data 1085. The system may then send the NLU hypothesis to a skill 790 associated therewith along with a request for output data. In some situations, the skill 790 may not be able to provide the system with output data. This results in the system indicating to the user that the user input could not be processed even though another skill associated with lower ranked NLU hypothesis could have provided output data responsive to the user input.

The post-NLU ranker 765 reduces instances of the aforementioned situation. As described, the post-NLU ranker 765 queries multiple skills associated with the NLU results data 1085 to provide result data 1030 to the post-NLU ranker 765 prior to the post-NLU ranker 765 ultimately determining the skill 790 to be invoked to respond to the user input. Some of the skills 790 may provide result data 1030 indicating responses to NLU hypotheses while other skills 790 may providing result data 1030 indicating the skills cannot provide responsive data. Whereas a system not implementing the post-NLU ranker 765 may select one of the skills 790 that could not provide a response, the post-NLU ranker 765 only selects a skill 790 that provides the post-NLU ranker 765 with result data corresponding to a response, indicating further information is needed, or indicating multiple responses can be generated.

The post-NLU ranker 765 may select result data 1030, associated with the skill 790 associated with the highest score, for output to the user. Alternatively, the post-NLU ranker 765 may output ranked output data 1025 indicating skills 790 and their respective post-NLU ranker rankings. Since the post-NLU ranker 765 receives result data 1030, potentially corresponding to a response to the user input, from the skills 790 prior to post-NLU ranker 765 selecting one of the skills or outputting the ranked output data 1025, little to no latency occurs from the time skills provide result data 1030 and the time the system outputs responds to the user.

If the post-NLU ranker 765 selects result audio data to be output to a user and the system determines content should be output audibly, the post-NLU ranker 765 (or another component of the supporting device(s) 120) may cause the device 110*a* and/or the device 110*b* to output audio corresponding to the result audio data. If the post-NLU ranker 765 selects result text data to output to a user and the system determines content should be output visually, the post-NLU ranker 765 (or another component of the supporting device(s) 120) may cause the device 110*b* to display text corresponding to the result text data. If the post-NLU ranker 765 selects result audio data to output to a user and the system determines content should be output visually, the post-NLU ranker 765 (or another component of the supporting device(s) 120) may send the result audio data to the ASR component 750. The ASR component 750 may generate output text data corresponding to the result audio data. The supporting device(s) 120 may then cause the device 110*b* to display text corresponding to the output text data. If the post-NLU ranker 765 selects result text data to output to a user and the system determines content should be output audibly, the post-NLU ranker 765 (or another component of the supporting device(s) 120) may send the result text data to the TTS component 780. The TTS component 780 may generate output audio data (corresponding to computer-generated speech) based on the result text data. The supporting device(s) 120 may then cause the device 110*a* and/or the device 110*b* to output audio corresponding to the output audio data.

As described, a skill 790 may provide result data 1030 either indicating a response to the user input, indicating more information is needed for the skill 790 to provide a response to the user input, or indicating the skill 790 cannot provide a response to the user input. If the skill 790 associated with the highest post-NLU ranker score provides the post-NLU ranker 765 with result data 1030 indicating a response to the user input, the post-NLU ranker 765 (or another component of the supporting device(s) 120, such as the orchestrator component 730) may simply cause content corresponding to the result data 1030 to be output to the user. For example, the post-NLU ranker 765 may send the result data 1030 to the orchestrator component 730. The orchestrator component 730 may cause the result data 1030 to be sent to the device (110*a*/110*b*), which may output audio and/or display text corresponding to the result data 1030. The orchestrator component 730 may send the result data 1030 to the ASR component 750 to generate output text data and/or may send the result data 1030 to the TTS component 780 to generate output audio data, depending on the situation.

The skill 790 associated with the highest post-NLU ranker score may provide the post-NLU ranker 765 with result data 1030 indicating more information is needed as well as instruction data. The instruction data may indicate how the skill 790 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 765 may simply cause the received instruction data be output by the device (110a/110b). Alternatively, the instruction data may be in a format that is not capable of being output by the device (110a/110b). When this occurs, the post-NLU ranker 765 may cause the ASR component 750 or the TTS component 780 to process the instruction data, depending on the situation, to generate instruction data that may be output by the device (110a/110b). Once the user provides the system with all further information needed by the skill 790, the skill 790 may provide the system with result data 1030 indicating a response to the user input, which may be output by the system as detailed above.

The system may include "informational" skills 790 that simply provide the system with information, which the system outputs to the user. The system may also include "transactional" skills 790 that require a system instruction to execute the user input. Transactional skills 790 include ride sharing skills, flight booking skills, etc. A transactional skill 790 may simply provide the post-NLU ranker 765 with result data 1030 indicating the transactional skill 790 can execute the user input. The post-NLU ranker 765 may then cause the system to solicit the user for an indication that the system is permitted to cause the transactional skill 790 to execute the user input. The user-provided indication may be an audible indication or a tactile indication (e.g., activation of a virtual button or input of text via a virtual keyboard). In response to receiving the user-provided indication, the system may provide the transactional skill 790 with data corresponding to the indication. In response, the transactional skill 790 may execute the command (e.g., book a flight, book a train ticket, etc.). Thus, while the system may not further engage an informational skill 790 after the informational skill 790 provides the post-NLU ranker 765 with result data 1030, the system may further engage a transactional skill 790 after the transactional skill 790 provides the post-NLU ranker 765 with result data 1030 indicating the transactional skill 790 may execute the user input.

In some instances, the post-NLU ranker 765 may generate respective scores for first and second skills that are too close (e.g., are not different by at least a threshold difference) for the post-NLU ranker 765 to make a confident determination regarding which skill should execute the user input. When this occurs, the system may request the user indicate which skill the user prefers to execute the user input. The system may output TTS-generated speech to the user to solicit which skill the user wants to execute the user input.

Figure 11:
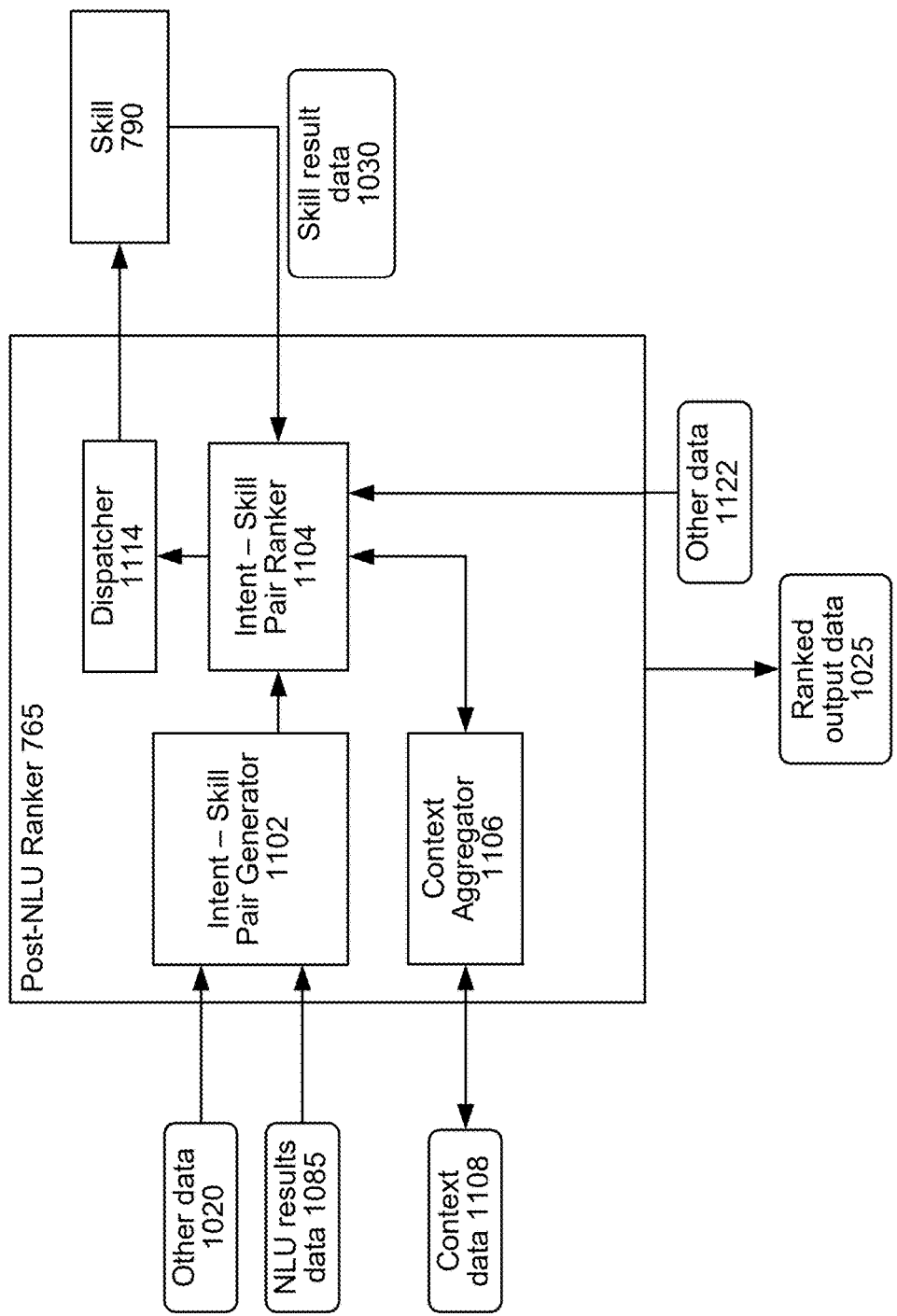
FIG. 11 is a conceptual diagram illustrating how a post-NLU ranker may process according to embodiments of the present disclosure.

FIG. 11 illustrates other configurations and operations of the post-NLU ranker 765. When the post-NLU ranker 765 receives NLU results data 1085, the NLU results data 1085 may be sent to an intent-skill pair generator 1102. The intent-skill pair generator 1102 may include information about what skills are capable of handling what intents. Such information may be context agnostic, and may thus indicate what skills are capable of handling what intents generally, without regard to the context associated with the user input. The intent-skill pair generator 1102 thus receives the NLU results data 1085 and identifies what particular candidate skills may handle the intent for NLU hypothesis. For example, if a NLU hypothesis includes a particular intent, the intent-skill pair generator 1102 identifies each skill that may execute with respect to the intent. For further example, if the NLU results data 1085 include multiple NLU hypotheses including multiple intents, the intent-skill pair generator 1102 associates each different NLU hypothesis with each skill that may execute with respect to the NLU hypothesis. As illustrated, the intent-skill pair generator 1102 may be implemented at part of the post-NLU ranker 765. However, one skilled in the art will appreciate that the intent-skill pair generator 1102 may be implemented as part of the NLU component 760 or in another component without departing from the present disclosure. In such a case, the NLU results data 1085 may include intent-skill pairs. The intent-skill pair generator 1102 may also receive and process the other data 1020 (described herein).

The post-NLU ranker 765 may also include an intent-skill pair ranker 1104. The intent-skill pair ranker 1104 ranks the intent-skill pairs generated by the intent-skill pair generator 1102 based on, for example, the number of filled slots of a NLU hypothesis, an NLU confidence score associated with a NLU hypothesis, context information output by a context aggregator 1106, and/or other data.

The post-NLU ranker 765 may include the context aggregator 1106. The context aggregator 1106 receives context data 1108 from various contextual sources. The context data 1108 may include time data, which represents a time of receipt of the user input by the device 110, a time or receipt of the user input by the supporting device(s) 120, a user identifier associated with the user input, a device identifier of the device 110, whether other devices are linked to the device 110, and/or other information. The context aggregator 1106 may aggregate the context data 1108 and put the context data 1108 in a form that can be processed by the intent-skill pair ranker 1104. Context data 1108 may include data obtained from the device 110 or from other services connected to the supporting device(s) 120.

The context data 1108 may include skill availability data. Such information may indicate what skills are available and authorized to process the user input. For example, if the user has only enabled certain skills, the enabled skills may be noted in the skill availability data.

The context data 1108 may also include dialogue data. A "dialogue" or "dialogue session" as used herein may refer to data transmissions (such as relating to multiple user inputs and supporting device(s) 120 outputs) between the supporting device(s) 120 and a local device (e.g., the device 110) that all relate to a single originating user input. Thus, the data transmissions of a dialogue session may share a dialogue identifier or other unique identifier that may be used by the orchestrator component 730, skill(s) 790, skill server(s) 125, etc. to track information across the dialogue session. For example, the device 110 may send the supporting device(s) 120 data corresponding to "Alexa, play jeopardy." The supporting device(s) 120 may output data corresponding to a jeopardy statement to the device 110 for output to a user(s). A user may then respond to the statement, which the device 110 sends as data to the supporting device(s) 120. The sending of data from the device 110 to the supporting device(s) 120 and the sending of data from the supporting device(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the supporting device(s) 120). The context data 1108 may be one portion of the data used by the intent-skill pair ranker 1104 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 1108 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the supporting device(s) 120. The context data 1108 (and/or other data 1122) may include a metadata flag/indicator that represents whether the particular skill being executed is one that can handle a go-back (or other navigational) request.

The context data 1108 may also include user profile data. The user profile data may represent preferences and/or characteristics of the user that originated the current user input. Such data may be received from the profile storage 770.

The context data 1108 may also include location data. The location data may represent a location of the device 110 from which the user input was received.

The context data 1108 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group of words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 1108 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 1108 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 1108 may also include other context data not explicitly recited herein.

The intent-skill pair ranker 1104 may operate one or more trained models that are configured to process the NLU results data 1085, the skill result data 1030, the other data 1020, and the other data 1122 in order to determine a single best skill for executing the current user input from the available pairs output by the intent-skill pair generator 1102. The intent-skill pair ranker 1104 may send queries to the skills and request a first skill and a second skill (for example the candidate skills identified by the pair generator 1102), to provide potential result data indicating whether the skill can handle the intent at the particular moment and if so, what the output data for the particular skill would be (e.g., data the skill would provide to a user if the skill were selected to execute the user input) based on the NLU results data 1085. For example, the intent-skill pair ranker 1104 may send a first NLU hypothesis, associated with a first skill, to the first skill along with a request for the first skill to at least partially execute with respect to the first NLU hypothesis. The intent-skill pair ranker 1104 may also send a second NLU hypothesis, associated with the second skill, to the second skill along with a request for the second skill to at least partially execute with respect to the second NLU hypothesis. The intent-skill pair ranker 1104 receives, from the first skill, first result data 1030*a* generated from the first skill's execution with respect to the first NLU hypothesis. The intent-skill pair ranker 1104 also receives, from the second skill, second results data 1030*b* generated from the second skill's execution with respect to the second NLU hypothesis. Based on the first results data 1030*a*, a first NLU confidence score associated with the first NLU hypothesis, the second results data 1030*b*, a second NLU confidence score associated with the second NLU hypothesis, and other data 1122 (e.g., context data, user profile data, etc.), the intent-skill pair ranker 1104 determines the best skill for executing the current user input. The intent-skill pair ranker 1104 sends an indication of the best skill to a dispatcher component 1114.

The dispatcher 1114 may then send the selected skill the information needed to execute the user input, including an indication of the intent, the appropriate context data 1108 (such as device identifier, user identifier, or the like), slot data, utterance identifier, dialogue identifier, or any other information needed.

One or more models implemented by components of the orchestrator component 730, post-NLU ranker 765, shortlister 950, or other component may be trained and operated according to various machine learning techniques.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
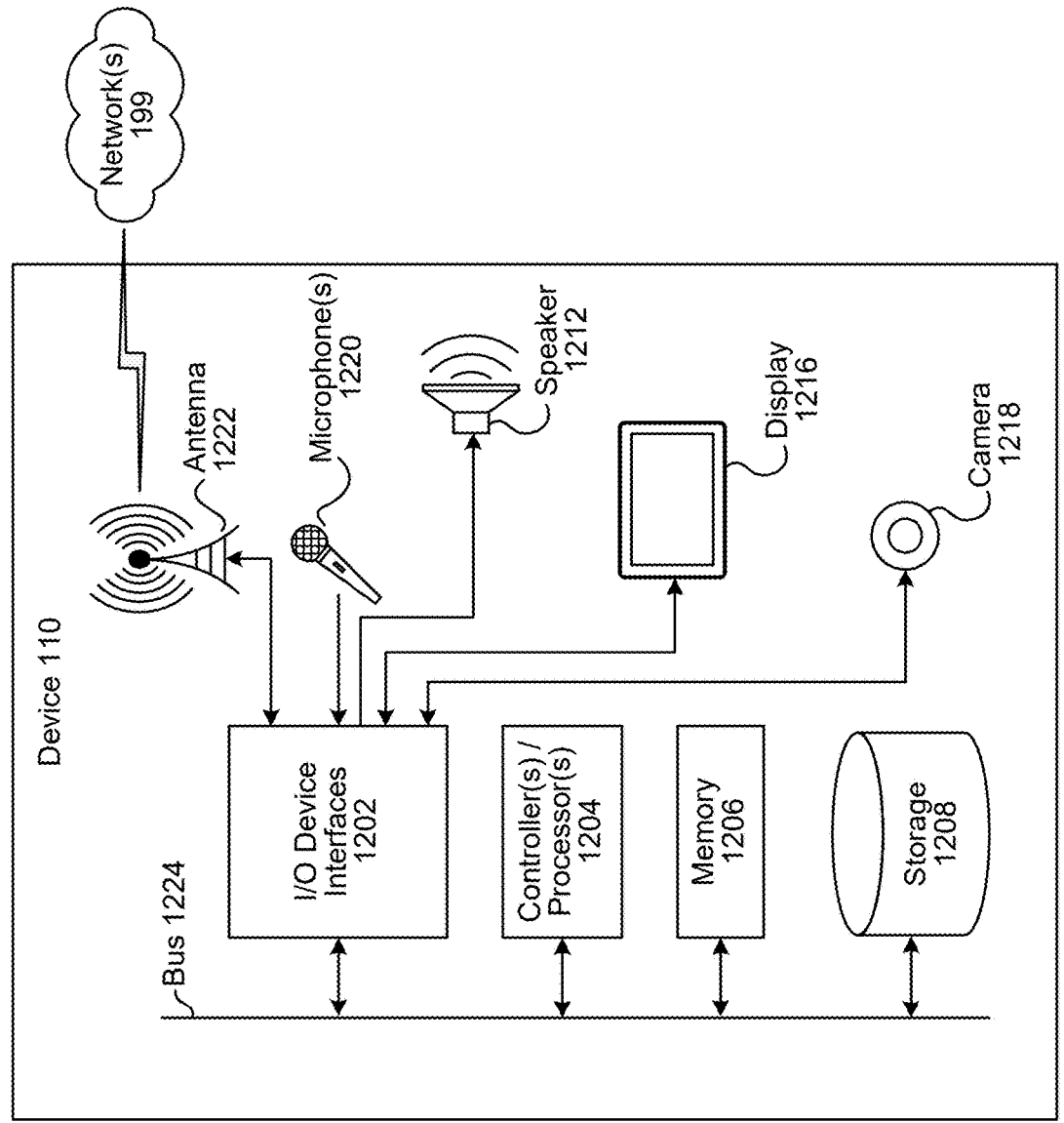
FIG. 12 is a block diagram conceptually illustrating example components of a device, according to embodiments of the present disclosure.
Figure 13:
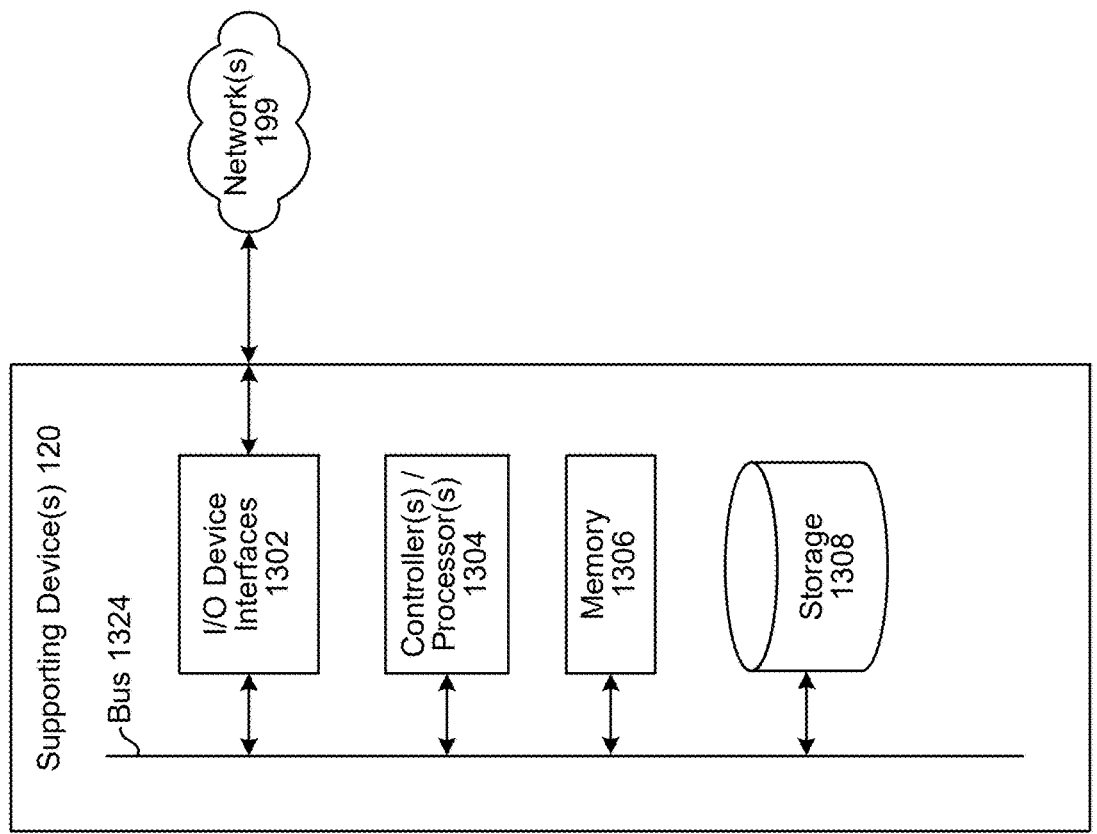
FIG. 13 is a block diagram conceptually illustrating example components of a system, according to embodiments of the present disclosure.

FIG. 12 is a block diagram conceptually illustrating a device 110 that may be used with the system. FIG. 13 is a block diagram conceptually illustrating example components of supporting devices 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) he server/supporting device 120 may be located remotely from the device 110 as its operations may not require proximity to the user. The server/supporting device 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/supporting device 120 being in a user's home/business is that data used to process a command/return a response may be kept within the user's home, thus reducing potential privacy concerns.

Multiple systems (120/125) may be included in the overall system 100 of the present disclosure, such as one or more natural language processing supporting devices 120 for performing ASR processing, one or more natural language processing supporting devices 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the supporting devices 120, or a skill system 125 may include their own dedicated processors, memory, and/or storage. Alternatively, one or more of the components of the device(s) 110, the supporting devices 120, or a skill system 125 may utilize the I/O interfaces (1202/1302), processor(s) (1204/1304), memory (1206/1306), and/or storage (1208/1308) of the device(s) 110, natural language command processing supporting device 120, or the skill system 125, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing supporting device 120, and a skill system 125, as described herein, are illustrative, and may be located as a stand-alone device or may be included, in whole or in part, as a component of a larger device or system. As can be appreciated, a number of components may exist either on a supporting device 120 and/or on device 110. For example, language processing 792/892 (which may include ASR 750/850), language output 793/893 (which may include NLG 779/879 and TTS 780/880), etc., for example as illustrated in FIGS. 7 and 8. Unless expressly noted otherwise, the system version of such components may operate similarly to the device version of such components and thus the description of one version (e.g., the system version or the local version) applies to the description of the other version (e.g., the local version or system version) and vice-versa.

Figure 14:
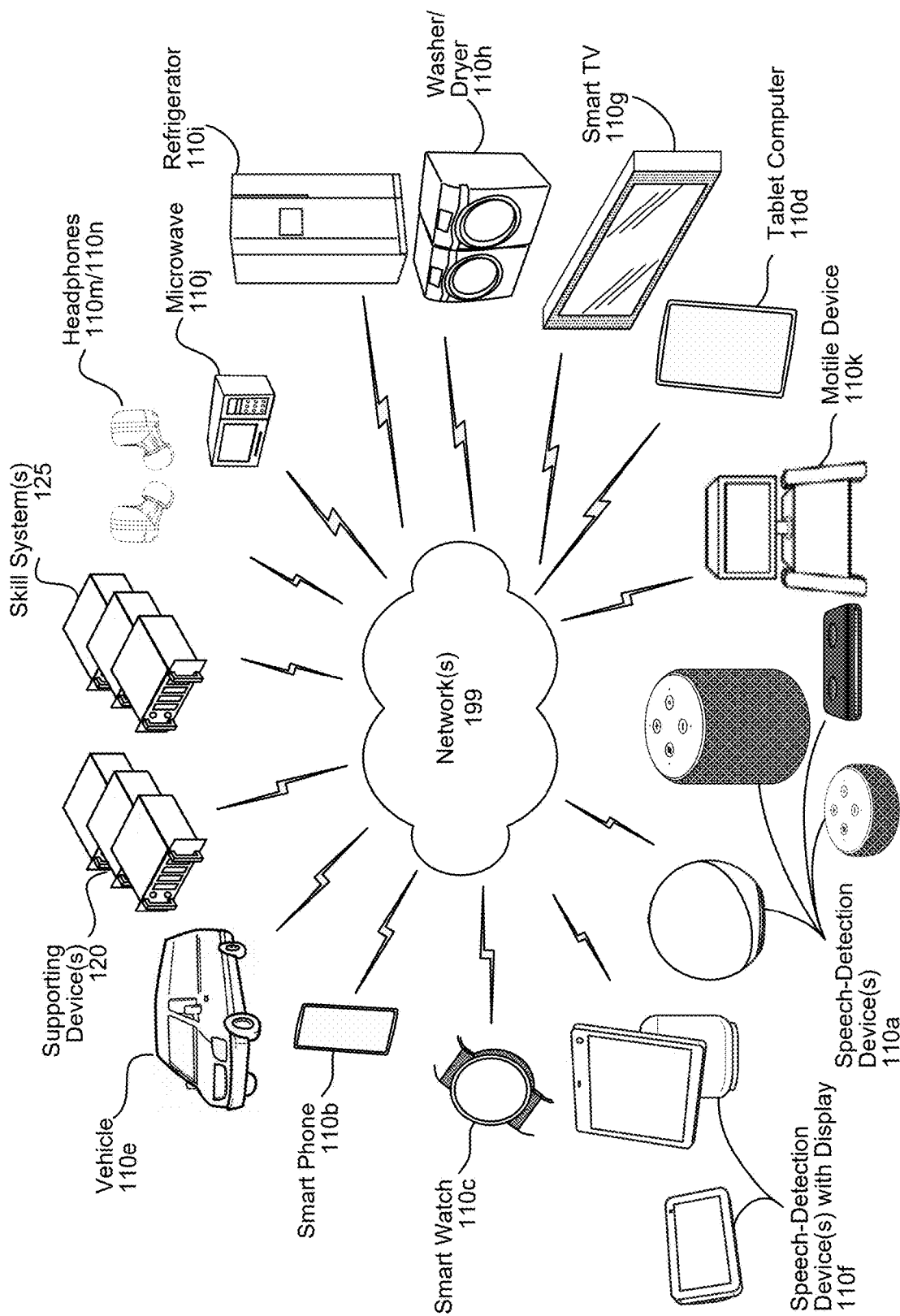
FIG. 14 illustrates an example of a computer network for use with the overall system, according to embodiments of the present disclosure.

As illustrated in FIG. 14, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing supporting device 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 750, the NLU component 760, etc. of the supporting devices 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   processing, using a first language model, a first plurality of training natural language inputs to determine first training data, wherein the first plurality of training natural language inputs are unlabeled data;
   determining, using the first training data, a first group of training natural language inputs, from the first plurality of training natural language inputs, corresponding to a first functionality;
   determining, using the first training data, a second group of training natural language inputs, from the first plurality of training natural language inputs, corresponding to a second functionality;
   configuring a second language model based on the first group of training natural language inputs corresponding to the first functionality and the second group of training natural language inputs corresponding to the second functionality, wherein the second language model is configured to generate a representation of a natural language input corresponding to functionalities;
   determining, using the second language model, first data corresponding to a first user input;
   determining, using at least the first data, that the first user input corresponds to the first functionality; and
   based at least in part on the first user input corresponding to the first functionality, determining first output data corresponding to the first functionality, the first output data to be presented in response to a subsequently received user input corresponding to the first functionality.

2. The computer-implemented method of claim 1, further comprising:
   determining, using a natural understanding (NU) component and the first user input, that the first functionality is unsupported by the NU component; and
   in response to determining that the first functionality is unsupported, using at least the first user input to update the NU component.

3. The computer-implemented method of claim 1, further comprising:
   determining, using a NU component and the first user input, that the first functionality is unsupported by the NU component;
   receiving input data corresponding to a fourth natural language input;
   determining, using the second language model, second data corresponding to the input data;
   determining, using the second data, that the fourth natural language input corresponds to the first functionality;
   in response to determining that the first functionality is unsupported, determining second output data including a representation of a third functionality alternative to the first functionality; and
   causing the second output data to be presented in response to receiving the input data.

4. The computer-implemented method of claim 1, further comprising:
   receiving second user input received by a natural language processing system during a first time period, wherein the first user input was received by the natural language processing system during a second time period after the first time period;
   determining, using the second language model, second data corresponding to the second user input;
   determining, using the second data, that the second user input corresponds to a third functionality different than the first functionality; and
   based on the first user input being received during the second time period after the first time period, determining the first output data, wherein the first output data is to be presented to the subsequently received user input corresponding to the first functionality.

5. The computer-implemented method of claim 1, further comprising:
   receiving second user input received by a natural language processing system, the second user input associated with a first geographic region, and the first user input associated with a second geographic region;
   determining, using the second language model, second data corresponding to the second user input;
   determining, using the second data, that the second user input corresponds to a third functionality different than the first functionality; and
   based at least in part on the second user input corresponding to the third functionality, determining second output data corresponding to the third functionality, the second output data to be presented in response to a user input associated with the first geographic region, wherein the first output data is to be presented in response to the subsequently received user input associated with the second geographic region.

6. The computer-implemented method of claim 1, further comprising:

receiving a second plurality of training natural language inputs that is labeled data; and further configuring the second language model based on the second plurality of training natural language inputs.

7. The computer-implemented method of claim 1, further comprising:

receiving second data including a second plurality of training natural language inputs, the second data further including and a first entity represented in a first training natural language input of the second plurality of training natural language inputs;

processing, using the first language model, the second data to determine second training data;

processing, using a classification model configured to identify entities in natural language inputs, the second training data to determine that the first entity is represented in the first training natural language input; and configuring the second language model based at least in part on the first entity being represented in the first training natural language input.

8. The computer-implemented method of claim 1, further comprising:

receiving second user input received by a natural language processing system during a first portion of a day, wherein the first user input were received during a second portion of the day;

determining, using the second language model, second data corresponding to the second user input;

determining, using the second data, that the second user input corresponds to a third functionality different than the first functionality; and based at least in part on the second user input corresponding to the third functionality, determining second output data corresponding to the third functionality, the second output data to be presented in response to a first subsequent user input received during the first portion of the day, wherein the first output data is to be presented in response to a second subsequent user input received during the second portion of the day.

9. A system comprising:

at least one processor; and at least one memory including instructions that, when executed by the at least one processor, cause the system to:

process, using a first language model, a first plurality of training natural language inputs to determine first training data, wherein the first plurality of training natural language inputs are unlabeled data;

determine, using the first training data, a first group of training natural language inputs, from the first plurality of training natural language inputs, corresponding to a first functionality;

determine, using the first training data, a second group of training natural language inputs, from the first plurality of training natural language inputs, corresponding to a second functionality;

configure a second language model based on the first group of training natural language inputs corresponding to the first functionality and the second group of training natural language inputs corresponding to the second functionality, wherein the second language model is configured to generate a representation of a natural language input corresponding to functionalities;

determine, using the second language model, first data corresponding to a first user input;

determine, using at least the first data, that the first user input corresponds to the first functionality; and based at least in part on the first user input corresponding to the first functionality, determine first output data corresponding to the first functionality, the first output data to be presented in response to a subsequently received user input corresponding to the first functionality.

10. The system of claim 9, wherein the at least one memory includes further instructions that, when executed by the at least one processor, further cause the system to:

determine, using a natural understanding (NU) component and the first user input, that the first functionality is unsupported by the NU component; and in response to determining that the first functionality is unsupported, use at least the first user input to update the NU component.

11. The system of claim 9, wherein the at least one memory includes further instructions that, when executed by the at least one processor, further cause the system to:

determine, using a NU component and the first user input, that the first functionality is unsupported by the NU component;

receive input data corresponding to a fourth natural language input;

determine, using the second language model, second data corresponding to the input data;

determine, using the second data, that the fourth natural language input corresponds to the first functionality;

in response to determining that the first functionality is unsupported, determine second output data including a representation of a third functionality alternative to the first functionality; and cause the second output data to be presented in response to receiving the input data.

12. The system of claim 9, wherein the at least one memory includes further instructions that, when executed by the at least one processor, further cause the system to:

receive second user input received by a natural language processing system during a first time period, wherein the first user input was received by the natural language processing system during a second time period after the first time period;

determine, using the second language model, second data corresponding to the second user input;

determine, using the second data, that the second user input corresponds to a third functionality different than the first functionality; and based on the first user input being received during the second time period after the first time period, determine the first output data, wherein the first output data is to be presented to the subsequently received user input corresponding to the first functionality.

13. The system of claim 9, wherein the at least one memory includes further instructions that, when executed by the at least one processor, further cause the system to:

receive second user input received by a natural language processing system, the second user input associated with a first geographic region, and the first user input associated with a second geographic region;

determine, using the second language model, second data corresponding to the second user input;

determine, using the second data, that the second user input corresponds to a third functionality different than the first functionality; and based at least in part on the second user input corresponding to the third functionality, determine second output data corresponding to the third functionality, the second output data to be presented in response to a user input associated with the first geographic region, wherein the first output data is to be presented in response to the subsequently received user input associated with the second geographic region.

14. The system of claim 9, wherein the at least one memory includes further instructions that, when executed by the at least one processor, further cause the system to:

receive a second plurality of training natural language inputs that is labeled data; and further configure the second language model based on the second plurality of training natural language inputs.

15. The system of claim 9, wherein the at least one memory includes further instructions that, when executed by the at least one processor, further cause the system to:

receive second data including a second plurality of training natural language inputs, the second data further including a first entity represented in a first training natural language input of the second plurality of training natural language inputs;

process, using the first language model, the second data to determine second training data;

process, using a classification model configured to identify entities in natural language inputs, the second training data to determine that the first entity is represented in the first training natural language input; and configure the second language model based at least in part on the first entity being represented in the first training natural language input.

16. The system of claim 9, wherein the at least one memory includes further instructions that, when executed by the at least one processor, further cause the system to:

receive second user input received by a natural language processing system during a first portion of a day, wherein the first user input were received during a second portion of the day;

determine, using the second language model, second data corresponding to the second user input;

determine, using the second data, that the second user input corresponds to a third functionality different than the first functionality; and based at least in part on the second user input corresponding to the third functionality, determine second output data corresponding to the third functionality, the second output data to be presented in response to a first subsequent user input received during the first portion of the day, wherein the first output data is to be presented in response to a second subsequent user input received during the second portion of the day.

17. The computer-implemented method of claim 1, further comprising:

receiving second data corresponding to a first plurality of previous user inputs previously received by a natural language processing system, the second data including at least first input data corresponding to a second user input of the first plurality of previous user inputs, wherein the first data further corresponds to the second data.

18. The computer-implemented method of claim 17, further comprising:

determining third data corresponding to a plurality of functionalities executable by the natural language processing system, wherein an embedding space corresponding to the second language model is based at least in part on the third data.

19. The system of claim 9, wherein the at least one memory includes further instructions that, when executed by the at least one processor, further cause the system to:

receive second data corresponding to a first plurality of previous user inputs previously received by a natural language processing system, the second data including at least first input data corresponding to a second user input of the first plurality of previous user inputs, wherein the first data further corresponds to the second data.

20. The system of claim 19, wherein the at least one memory includes further instructions that, when executed by the at least one processor, further cause the system to:

determine third data corresponding to a plurality of functionalities executable by the natural language processing system, wherein an embedding space corresponding to the second language model is based at least in part on the third data.

* * * * *